United States Patent
Abe et al.

(10) Patent No.: US 8,418,670 B2
(45) Date of Patent: Apr. 16, 2013

(54) ROLLER BEARING, CAM SHAFT SUPPORT STRUCTURE, INTERNAL COMBUSTION ENGINE AND INCORPORATION METHOD OF ROLLER BEARING

(75) Inventors: Katsufumi Abe, Iwata (JP); Akihiko Katayama, Kikugawa (JP); Yugo Yoshimura, Iwata (JP); Shinji Oishi, Iwata (JP); Hiroki Tsuchiyama, Utsunomiya (JP); Noriaki Fujii, Wako (JP); Tomoya Fujimoto, Wako (JP); Keiko Yoshida, Wako (JP); Kiminori Komura, Wako (JP); Kazuto Abe, Wako (JP)

(73) Assignees: NTN Corporation, Osaka (JP); Honda Motor Co., Ltd., Tokyo (JP)

( * ) Notice: Subject to any disclaimer, the term of this patent is extended or adjusted under 35 U.S.C. 154(b) by 975 days.

(21) Appl. No.: 12/310,688

(22) PCT Filed: Aug. 30, 2007

(86) PCT No.: PCT/JP2007/066941
§ 371 (c)(1),
(2), (4) Date: Mar. 4, 2009

(87) PCT Pub. No.: WO2008/029713
PCT Pub. Date: Mar. 13, 2008

(65) Prior Publication Data
US 2010/0065010 A1    Mar. 18, 2010

(30) Foreign Application Priority Data

Sep. 4, 2006  (JP) ................................. 2006-238423
Sep. 4, 2006  (JP) ................................. 2006-238424
Sep. 4, 2006  (JP) ................................. 2006-238425
Sep. 4, 2006  (JP) ................................. 2006-238428

(51) Int. Cl.
*F02B 67/00* (2006.01)
*F02F 7/00* (2006.01)
*F16M 1/00* (2006.01)

(52) U.S. Cl.
USPC .................. 123/195 A; 123/90.1; 123/195 R; 384/548; 384/570

(58) Field of Classification Search ................ 123/90.1, 123/90.15, 90.16, 90.17, 195 R, 195 A; 384/457, 384/419, 428, 429, 418, 294, 52, 55, 906, 384/501–506, 570, 560, 564, 569, 577, 585, 384/548, 555, 621, 513
See application file for complete search history.

(56) References Cited

U.S. PATENT DOCUMENTS 7,328,681 B2 *  2/2008  Tidwell ..................... 123/195 R
2005/0084192 A1 *  4/2005  Takeo et al. ................... 384/457
2005/0265644 A1  12/2005  Waseda FOREIGN PATENT DOCUMENTS
JP   40-27881   12/1965
JP   60-158023  10/1985
(Continued)

*Primary Examiner* — Thomas Denion
*Assistant Examiner* — Daniel Bernstein
(74) *Attorney, Agent, or Firm* — Clark & Brody

(57) ABSTRACT

A needle roller bearing (21) as a roller bearing comprises an outer ring (22) having a plurality of outer ring members (22a) and (22b) split by a split line extending in the axial direction of the bearing, and a plurality of needle rollers (23) arranged along the track surface of the outer ring (22). The outer ring member (22a) is in the form of a semicircular shape having a center angle of 180° and has an engagement click (22c) bent from one circumferential side end to the radial outer side. The two outer ring members (22a) and (22b) are connected in the circumferential direction to form the annular outer ring (22).

32 Claims, 27 Drawing Sheets

| | FOREIGN PATENT DOCUMENTS | |
|---|---|---|
| JP | 62-002016 | 1/1987 |
| JP | 1-82331 | 6/1989 |
| JP | 3-11127 | 2/1991 |
| JP | 06-12829 | 2/1994 |
| JP | 06-213239 | 8/1994 |
| JP | 6-87724 | 12/1994 |
| JP | 00/19117 | 4/2000 |
| JP | 2001-355643 | 12/2001 |
| JP | 2003-130034 | 5/2003 |
| JP | 2003-322138 | 11/2003 |
| JP | 2005-9696 | 4/2005 |
| JP | 2005-090696 | 4/2005 |
| WO | 00/19117 | 4/2000 |

* cited by examiner

ROLLER BEARING, CAM SHAFT SUPPORT STRUCTURE, INTERNAL COMBUSTION ENGINE AND INCORPORATION METHOD OF ROLLER BEARING

TECHNICAL FIELD

The present invention relates to a roller bearing supporting a cam shaft, a crank shaft, and a rocker shaft for a car engine, a cam shaft support structure using the roller bearing, an internal combustion engine, and a method for incorporating the roller bearing to the cam shaft and the like.

BACKGROUND ART

A conventional cam shaft support structure used for a car internal combustion engine is disclosed in Japanese Unexamined Patent Publication No. 2005-90696, for example. Referring to FIG. 50, the cam shaft support structure described in the document comprises a cam shaft 201 having a cam lobe 201a, a cylindrical journal part 201b supported by a roller bearing 202, and an end large diameter part 201c, a housing comprising a cylinder head 208 and a cap 209, and the roller bearing 202 including a plurality of rollers 203, roughly semi-cylindrical retainers 204 and 205, and roughly semi-cylindrical race plates 206 and 207, and supporting the cam shaft 201 rotatably with respect to the housing.

Here, the outer diameter dimension of the journal part 201b is smaller than the maximum dimension of the outer diameter of the cam lobe 201a and the outer diameter dimension of the end large diameter part 201c. Therefore, the roller bearing 202 to be arranged at the journal part 201b to support the cam shaft 201 rotatably cannot be inserted from the axial direction of the cam shaft 201.

Thus, the roller bearing 202 has the plurality of rollers 203, the circumferentially split roughly semi-cylindrical retainers 204 and 205, and the circumferentially split roughly semi-cylindrical race plates 206 and 207 arranged between the cylinder head 208 and the cap 209. In addition, referring to FIG. 51, the race plate 207 has two projections 207a projecting from the circumferential each end to the radial outer side, and the cap 209 has recessions 209a corresponding to the projections 207a.

Thus, according to the document, when the projections 207a engages with the recessions 209a, the relative movement between the race plate 207 and the cap 209 is prevented in the circumferential direction and an axial direction during the rotation of the roller bearing 202. In addition, the same is true on the space between the race plate 206 and the cylinder head 208.

The race plates 206 and 207 having the above constitution are produced by pressing a steel plate such as cold rolled steel plate (SPC) in general. In addition, a heat treatment is performed in order to obtain predetermined mechanical properties such as hardness after the predetermined configuration is provided.

According to the roller bearing 202 disclosed in the above document, the projection 207a is formed by applying force in the direction of radial outer side from the inner diameter surface of the race plate 207 so that the outer diameter surface thereof is protruded. As a result, a recession is formed in the inner diameter surface of the race plate 207 serving as a track surface of the roller 203, which causes vibration to be generated when the roller 203 passes through the recession, and the surface of the roller 203 to be removed in an early stage, so that the smooth rotation of the roller 203 is hindered.

Furthermore, although the roller bearing 202 rotates with lubricant oil supplied from an oil pump (not shown) set outside, the lubricant oil is discharged from the space between the cam shaft 201 and the race plates 206 and 207 in large amounts. Meanwhile, as the oil pump has been required to be miniaturized recently, the lubricant oil could not be supplied to the roller bearing 202 sufficiently.

In addition, this problem arises in not only the roller bearing supporting the cam shaft, but also a bearing supporting the crank shaft and the rocker shaft.

In addition, according to an assembling method of the above cam shaft support structure, the race plate 206, the retainer 204 previously provided with the rollers 203, the cam shaft 201, the retainer 203, the race plate 207 and the cap 209 are assembled in this order onto the cylinder head 208, and finally, the cylinder head 208 and the cap 209 are fastened by a bolt and the like in general.

Here, since the race plates 206 and 207 and the retainers 204 and 205 are not fixed to any part during the assembling operation, when these are shifted in position or fall, the assembling operation has to be started all over again. This problem is especially serious in the cam shaft support structure of an engine having many cylinders.

DISCLOSURE OF THE INVENTION

Thus, it is an object of the present invention to provide a roller bearing supporting a cam shaft of a car engine and the like, in which an outer ring is prevented from rotating in a housing, and roller can rotate smoothly during the rotation of the bearing.

It is another object of the present invention to provide a roller bearing supporting a cam shaft of a car engine and the like, in which an outer ring is prevented from rotating with a simple structure.

It is still another object of the present invention to provide a roller bearing supporting a cam shaft of a car engine and the like, in which a roller can smoothly rotate.

It is still another object of the present invention to provide a cam shaft support structure and an internal combustion engine superior in durability and high in reliability by employing the above roller bearing as a bearing supporting a cam shaft.

It is still another object of the present invention to provide a cam shaft support structure and an internal combustion engine, in which an assembling operation is simplified by preventing a bearing component from escaping during the assembling operation.

A roller bearing according to the present invention comprises an outer ring formed by connecting a plurality of arc-shaped outer ring members in a circumferential direction, and a plurality of rollers arranged along a track surface formed in the inner diameter surface of the outer ring. The outer ring has an engagement click bent from its circumferential end to the radial outer side so as to engage with a housing.

According to the above constitution, when the outer ring is split into the plurality of outer ring members, the roller bearing can be applied to a place in which the bearing cannot be inserted in the axial direction, like the cam shaft. In addition, when the engagement click engaging with the housing is provided, the outer ring is prevented from rotating in the housing during the rotation of the bearing.

Furthermore, when the engagement click is formed by bending the circumferential end of the outer ring member to the radial outer side, the inner diameter surface of the outer ring member serving as the track surface of the roller can be kept in the smooth state. As a result, the roller of the roller bearing can rotate smoothly.

Preferably, the engagement click is provided only at one side end of circumferential both side ends of the outer ring member. The rotation of the outer ring member can be prevented only by providing the engagement member engaging with the housing, at one circumferential side end. Thus, since the number of the engagement member is reduced, the recession of the track surface is reduced in number, so that the rotation of the roller is stabilized and the production step is reduced in number and the production cost can be lowered.

Preferably, the engagement click is provided at a part apart from the track surface of the circumferential end of the outer ring member. When the engagement member is provided at the position apart from the track surface, that is, it is provided at the axial end, the impact of the outer ring member deformation due to the recession generated when the engagement member is formed, on the roller rotation can be minimized. Thus, the roller of the roller bearing can rotate smoothly.

Preferably, the outer ring member has the plurality of engagement clicks, and the plurality of engagement clicks are arranged on a straight line parallel to the rotation axis of the bearing. For example, in the case where the bearing supports the cam shaft rotatably, the abutment surface between the cylinder head and the bearing cap for housing the cam shaft is parallel to the axial direction of the cam shaft in general. Thus, when the plurality of engagement clicks are arranged linearly so as to parallel to the rotation axis of the bearing, the engagement click can engage with the abutment surface between the cylinder head and the bearing cap.

Preferably, the outer ring member includes a projection part projecting from one circumferential side end in the circumferential direction, flat parts provided at axial both sides of the projection part so as to be parallel to the axial direction of the bearing, a recession part recessed from the other circumferential side end in the circumferential direction so as to receive the projection part of the adjacent outer ring member, and the engagement clicks are provided on axial both sides of the recession part.

A certain space is formed between the abutment part between the adjacent outer ring members in the circumferential direction and the axial direction in view of the dimensional change due to the thermal expansion and the like of the outer ring member. Therefore, when the circumferential ends of the outer ring members abutting on each other are formed parallel to the axial direction, a groove extending in the axial direction is formed at the abutment part. In this case, the roller is fit in the groove at the abutment part during the bearing rotation, which hinders the smooth rotation of the roller. Thus, when the abutment part is formed in the roughly V shape, the roller can rotate smoothly.

Preferably, the engagement click is low in hardness as compared with other part of the outer ring member. A load is applied to the engagement click engaging with the housing in the rotation direction of the roller bearing. In order to prevent the engagement click from being damaged by that load, it is effective to enhance the toughness of the engagement click by lowering the hardness thereof as compared with the other part. In addition, while the hardness Hv required in the outer ring member used in the bearing supporting the cam shaft for the car engine is 653 or more, it is desirable that the hardness Hv of the engagement click is set within the range of 300 to 600. When its harness Hv is more than 600, the engagement click could be damaged by a sudden load. Meanwhile, when the hardness Hv is less than 300, the engagement click could wear away in an early stage.

A specific method for improving the toughness of the engagement click comprises a first step of quenching the whole outer ring member, and a second step of tempering only the engagement click after the first step.

Preferably, a wall surface of the engagement click continued to the outer diameter surface of the outer ring member and/or a wall surface of the engagement click continued to the inner diameter surface of the outer ring member comprise a plurality of parts having relatively different heights. Thus, when the wall surface of the engagement click has the plurality of parts having relatively different height, that is, the wall surface comprises the relatively high part and the relatively low part, the adhesiveness between the housing and the engagement click can be enhanced. Thus, even when high rotation toque is generated, the outer ring can be surely positioned with respect to the housing.

According to one embodiment, a wall surface of the engagement click continued to the outer diameter surface of the outer ring member and/or a wall surface of the engagement click continued to the inner diameter surface of the outer ring member comprise a projection part projecting from the wall surface.

According to another embodiment, a wall surface of the engagement click continued to the outer diameter surface of the outer ring member and/or a wall surface of the engagement click continued to the inner diameter surface of the outer ring member comprise a knurling groove.

According to still another embodiment, the engagement click further includes a bend part having a tip end bent in a direction intersecting the wall surface.

Preferably, the engagement clicks project from a plurality of parts of the circumferential end of the outer ring member and connected to each other at a position apart from the circumferential end. Thus, when the engagement clicks projecting from the plurality of positions of the circumferential end of the outer ring member are connected to each other, the load applied from the housing can be supported by the whole engagement click uniformly, and the engagement click can be prevented from being deformed by the load.

According to one embodiment, a region surrounded by the circumferential end of the outer ring member and the engagement click functions as a bolt hole for a bolt to fix the housing.

Preferably, the outer ring member further includes an oil hole having an opening penetrating from the outer diameter surface to the inner diameter surface, and when it is assumed that an effective length of the roller is l, and a diameter of the oil hole on the inner diameter surface side is $d_1$, they satisfy that $d_1/l < 0.5$.

According to the above constitution, when the oil hole for supplying the lubricant oil into the bearing is provided in the outer ring member, the roller bearing can be superior in lubricating property. Here, since the oil hole is formed in the track surface of the outer ring member, when its diameter is too large, the smooth rotation of the roller could be prevented. Thus, when the diameter of the oil hole on the inner diameter side is set within the above range, the roller bearing can implement high lubricating performance and the smooth rotation of the roller.

Preferably, the roller includes a rolling surface provided in the axial center and abutting on the inner diameter surface of the outer ring member, and chamfered parts at both ends of the rolling surface, and the oil hole is provided at a position opposed to the rolling surface of the roller.

When the oil hole is provided at the position opposed to the axial end of the roller, the axial end of the roller bearing passing over the oil hole could be caught by the wall surface of the oil hole to prevent the smooth rotation. Thus, when the oil hole is provided at the position opposed to the rolling surface, the above problem can be solved. In addition, according to the above constitution, since the lubricant oil can be directly supplied to the rolling surface of the roller, the roller bearing is further superior in lubricating property.

Preferably, the roller bearing further comprises a retainer for retaining an interval between the rollers, and the retainer has a split line provided at one part on the circumference and extending in the axial direction of the bearing. In addition, preferably, the outer ring member includes a flange part projecting from its axial end to the radial inner side to regulate the axial movement of the retainer.

Thus, the roller bearing having the above retainer can be applied to the place in which the bearing cannot be inserted in the axial direction, like the cam shaft. In addition, when the flange parts are provided at the axial both ends of the outer ring member, the axial movement of the retainer can be regulated.

Preferably, the retainer includes an axial end face opposed to the axial inner-side wall surface of the flange part, and an expansion part extending from the axial end face to a position opposed to a most inner diameter part of the flange part of the outer ring member. According to the roller bearing having the above constitution, the lubricant oil discharged in the axial direction of the bearing has to pass the space between the axial inner-side wall surface of the flange part of the outer ring member and the axial end face of the retainer, and the space between the most inner diameter part of the flange part and the expansion part of the retainer. Thus, since the oil path from the inside of the bearing to the axial outer side can be increased by providing the expansion part in the retainer, the lubricant oil retention property of the roller bearing can be improved.

Preferably, the expansion part includes a projection part projecting to the radial outer side so as to be opposed to the axial outer-side wall surface of the flange part of the outer ring member. Further preferably, the outer ring member further includes a bend part bent from the most inner diameter part of the flange part to the axial inner side, and the retainer further includes a recession part in the axial end face to receive the bend part. Thus, the oil path from the bearing inside to the axial outer side can be elongated to the space between the axial outer side wall surface of the flange part and the projection part, the roller bearing can be more superior in lubricant oil retention property.

A cam shaft support structure according to the present invention comprises a cam shaft, a housing holding the cam shaft, and a roller bearing supporting the cam shaft rotatably with respect to the housing. The roller bearing comprises an outer ring formed by connecting a plurality of arc-shaped outer ring members in a circumferential direction, and a plurality of rollers arranged along an inner diameter surface of the outer ring. The outer ring member includes an engagement click bent from its circumferential end to the radial outer side so as to engage with the housing.

Preferably, the cam shaft is divided into a load region in which a relatively high load is applied, and a non-load region in which a relatively low load is applied during the rotation, in its circumferential direction. Thus, the engagement click is preferably arranged at a position corresponding to the non-load region.

Further preferably, the outer ring member includes a projection part projecting from one circumferential side end in the circumferential direction, a recession part recessed from the other circumferential side end in the circumferential direction to receive the projection part of the adjacent outer ring member, and the engagement click at the other side end. The roller bearing is arranged such that the rotation direction of the cam shaft and the projection direction of the projection formed in the outer ring member coincide with each other.

An internal combustion engine according to the present invention comprises a housing, a cylinder provided in the housing, a valve opening and closing an inlet path and an exhaust path continued to the cylinder, a cam shaft controlling the opening and closing timings of the valve, and a roller bearing supports the cam shaft rotatably. The roller bearing comprises an outer ring formed by connecting a plurality of arc-shaped outer ring members in a circumferential direction, and a plurality of rollers arranged along an inner diameter surface of the outer ring. The outer ring includes an engagement click bent from its circumferential end to the radial outer side so as to engage with the housing.

Preferably, the outer ring member includes a projection part projecting from one circumferential side end in the circumferential direction, a recession part recessed from the other circumferential side end in the circumferential direction to receive the projection part of the adjacent outer ring member, and the engagement click at the other side end. The roller bearing is arranged such that the rotation direction of the cam shaft and the projection direction of the projection formed in the outer ring member coincide with each other.

According to the above constitution, when the roller bearing in which the outer ring is prevented from rotating in the housing and the roller can smoothly rotate is employed as the bearing supporting the cam shaft rotatably, the cam shaft support structure and the internal combustion engine can be superior in durability and high in reliability.

An incorporating method of a roller bearing in the present invention is a method for incorporating a roller bearing comprising an outer ring formed by connecting a plurality of arc-shaped outer ring members in a circumferential direction and a plurality of rollers arranged along the inner diameter surface of the outer ring, in which the outer ring member includes a projection part projecting from one circumferential side end in the circumferential direction, a recession part recessed from the other circumferential side end in the circumferential direction to receive the projection part of the adjacent outer ring member, and an engagement click bent from the other side end to the radial outer side so as to engage with a housing. More specifically, the method includes a step of arranging the roller bearing such that the rotation direction of the cam shaft and the projection direction of the projection formed in the outer ring member coincide with each other.

According to the roller bearing having the above constitution, when the projection part and the recession part of the adjacent outer ring members are combined, the annular outer ring is formed. In this case, when the rotation direction of the cam shaft, that is, the revolution direction of the roller is opposite to the projection direction of the projection part formed in the outer ring member, the roller collides against the tip end of the projection part and vibration is generated during the bearing rotation and the roller skews and the retainer moves in the axial direction, so that the retainer side face and the flange part of the outer ring could wear away and the rim part of the retainer and the flange part of the outer ring could be damaged. Thus, when the revolution direction of the roller coincides with the projection direction of the projection, art, the above problem can be solved.

According to the present invention, the outer ring can be prevented from rotating in the housing, and the roller can smoothly rotate in the roller bearing. In addition, when the above roller-bearing is used as the bearing supporting the cam shaft, the cam shaft support structure and the internal combustion engine can be superior in durability and high in reliability.

A roller bearing according to the present invention comprises an outer ring formed by connecting a plurality of arc-shaped outer ring members in a circumferential direction and a plurality of rollers arranged along the inner diameter surface of the outer ring. The outer ring member has an engagement member provided only at one circumferential side end of both side ends to engage with a housing.

According to the above constitution, when the outer ring is split into the plurality of outer ring members, the bearing can be applied to the place in which it cannot be inserted from the axial direction, like the cam shaft. In addition, when the engagement member engaging with the housing is provided, the outer ring can be prevented from rotating in the housing during the rotation of the bearing.

In addition, the outer ring member can be prevented from rotating by only providing the engagement member at one circumferential side end. Thus, since the number of position of the engagement member can be reduced and the recession of the track surface can be reduced in number, so that the roller rotation can be stabilized and the production step is reduced in number and the production cost can be lowered.

Preferably, the engagement member is an engagement click bend from one circumferential side end of the outer ring member to the radial outer side. Thus, when the engagement click is formed by bending the circumferential end of the outer ring member to the radial outer side, the inner diameter surface of the outer ring member serving as the rolling surface of the roller can be kept smooth. As a result, the roller of the roller bearing can rotate smoothly.

A cam shaft support structure according to the present invention comprises a cam shaft, a housing holding the cam shaft, and a roller bearing supporting the cam shaft rotatably with respect to the housing. The roller bearing includes an outer ring formed by connecting a plurality of arc-shaped outer ring members in a circumferential direction, and a plurality of rollers arranged along the inner diameter surface of the outer ring. The outer ring member includes an engagement member only at one circumferential side end of both side ends to engage with the housing.

An internal combustion engine according to the present invention comprises a housing, a cylinder provided in the housing, a valve opening and closing an inlet path and an exhaust path continued to the cylinder, a cam shaft controlling the opening and closing timings of the valve, and a roller bearing supporting the cam shaft. The roller bearing includes an outer ring formed by connecting a plurality of arc-shaped outer ring members in a circumferential direction, and a plurality of rollers arranged along the inner diameter surface of the outer ring. The outer ring member includes an engagement member only at one circumferential side end of both side ends to engage with the housing.

According to the above constitution, when the above roller bearing in which the outer ring can be prevented from rotating in the housing, and the roller can smoothly rotate is used as the bearing supporting the cam shaft, the cam shaft support structure and the internal combustion engine can be superior in durability and high in reliability.

According to the present invention, the outer ring can be prevented from rotating in the housing, and the roller can smoothly rotate in the roller bearing. In addition, when the above roller bearing is used as the bearing supporting the cam shaft, the cam shaft support structure and the internal combustion engine can be superior in durability and high in reliability.

A roller bearing according to the present invention comprises an outer ring formed by connecting a plurality of arc-shaped outer ring members in a circumferential direction, and a plurality of rollers arranged along the track surface formed in the inner diameter surface of the outer ring. The outer ring member has an engagement member provided at a position apart from the track surface of the circumferential end.

According to the above constitution, when the outer ring is split into the plurality of outer ring members, the bearing can be applied to the place in which it cannot be inserted from the axial direction, like the cam shaft. In addition, when the engagement member engaging with the housing is provided, the outer ring can be prevented from rotating in the housing during the bearing rotation.

In addition, since the engagement member is provided at the position apart from the track surface, that is, it is provided at the axial end, the impact of the outer ring member-deformation due to the recession generated when the engagement member is formed, on the roller rotation can be minimized. Thus, the roller of the roller bearing can rotate smoothly.

Preferably, the engagement member is formed only at one circumferential side end of the outer ring member. The outer ring member can be prevented from rotating by only providing the engagement member at one circumferential side end. Thus, since the number of position of the engagement member can be reduced and the recession of the track surface can be reduced in number, the roller rotation can be stabilized and the production step is reduced in number and the production cost can be lowered.

Preferably, the engagement member is an engagement click bent from the circumferential end of the outer ring member to the radial outer side. Thus, when the engagement click is formed by bending the circumferential end of the outer ring member to the radial outer side, the inner diameter surface of the outer ring member serving as the track surface of the roller can be kept in the smooth state. As a result, the roller of the roller bearing can rotate smoothly.

A cam shaft support structure according to the present invention comprises a cam shaft, a housing holding the cam shaft, and a roller bearing supporting the cam shaft rotatably with respect to the housing. The roller bearing includes an outer ring formed by connecting a plurality of arc-shaped outer ring members in a circumferential direction, and a plurality of rollers arranged along the track surface formed in the inner diameter surface of the outer ring. The outer ring member includes an engagement click provided at a position apart from the track surface of the circumferential end to engage with the housing.

An internal combustion engine according to the present invention comprises a housing, a cylinder provided in the housing, a valve opening and closing an inlet path and an exhaust path continued to the cylinder, a cam shaft controlling the opening and closing timings of the valve, and a roller bearing supporting the cam shaft. The roller bearing includes an outer ring formed by connecting a plurality of arc-shaped outer ring members in a circumferential direction, and a plurality of rollers arranged along the track surface formed in the inner diameter surface of the outer ring. The outer ring member includes an engagement member provided at a position apart form the track surface of the circumferential end to engage with the housing.

According to the above constitution, when the roller bearing in which the outer ring is prevented from rotating in the housing and the roller can rotate smoothly is used as the bearing supporting the cam shaft, the cam shaft support structure and the internal combustion engine can be superior in durability and high in reliability.

According to the present invention, the outer ring can be prevented from rotating in the housing, and the roller can smoothly rotate in the roller bearing. In addition, when the above roller bearing is used as the bearing supporting the cam shaft, the cam shaft support structure and the internal combustion engine can be superior in durability and high in reliability.

A cam shaft support structure according to the present invention comprises a cam shaft, a housing holding the cam shaft, and a roller bearing supporting the cam shaft rotatably with respect to the housing. The roller bearing includes an outer ring formed by connecting a plurality of arc-shaped outer ring members in a circumferential direction, and a plurality of rollers arranged along the inner diameter surface of the outer ring, and the outer ring member includes an engagement click projecting from the axial end to the radial outer side to engage with the housing. Thus, a projection part and a recession part receiving the projection part to prevent the outer ring member from escaping from the housing are provided on the opposed wall surfaces of the engagement click and the housing, respectively.

According to the cam shaft support structure having the above constitution, when the projection part of the housing and the recession part of the engagement click engage with each other, the assembling operation can be performed while the outer ring member engages with the housing so as not escape from the housing. When the engagement click is elastically deformable, since it can engage with elasticity, their adhesiveness can be improved. As a result, since the problem that the bearing component escapes during the assembling operation can be solved, the assembling operation can be simplified in the cam shaft support structure.

Preferably, the projection part and the recession part are positioned on a phantom line extending in the direction of the maximum load applied from the cam shaft to the roller bearing. The adhesiveness between the outer ring member and the housing is highest at the position in which the projection part engages with the recession part. Therefore, this roller bearing can support the highest load at this position (the position in which the projection part engages with the recession part). Thus, when this position is arranged at the region in which the highest load is applied, the cam shaft support structure can be superior in durability.

Further preferably, the outer ring member further includes a flange part projecting from an axial end to the radial inner side. The engagement click and the flange part are positioned on the same plane intersecting the rotation axis of the roller bearing. According to the above constitution, the outer ring member can be prevented from becoming large and the rigidity of the engagement click and the flange part is improved.

An internal combustion engine according to the present invention comprises a housing, a cylinder provided in the housing, a valve opening and closing an inlet path and an exhaust path continued to the cylinder, a cam shaft controlling the opening and closing timings of the valve, and a roller bearing supporting the cam shaft. The roller bearing includes an outer ring formed by connecting a plurality of arc-shaped outer ring members in a circumferential direction, and a plurality of rollers arranged along the inner diameter surface of the outer ring, and the outer ring member includes an engagement click projecting from the axial end to the radial outer side to engage with the housing. A projection part and a recession part receiving the projection part to prevent the outer ring member from escaping from the housing are provided on the opposed wall surfaces of the engagement click and the housing, respectively. When the cam shaft support structure having the above constitution is used, the assembling operation can be simplified in the internal combustion engine.

According to the present invention, since the assembling operation can be performed while the outer ring member previously engages with the housing so as not to escape from it, the assembling operation can be simplified in the cam shaft support structure and the internal combustion engine.

BEST MODE FOR CARRYING OUT THE INVENTION

Figure 47:
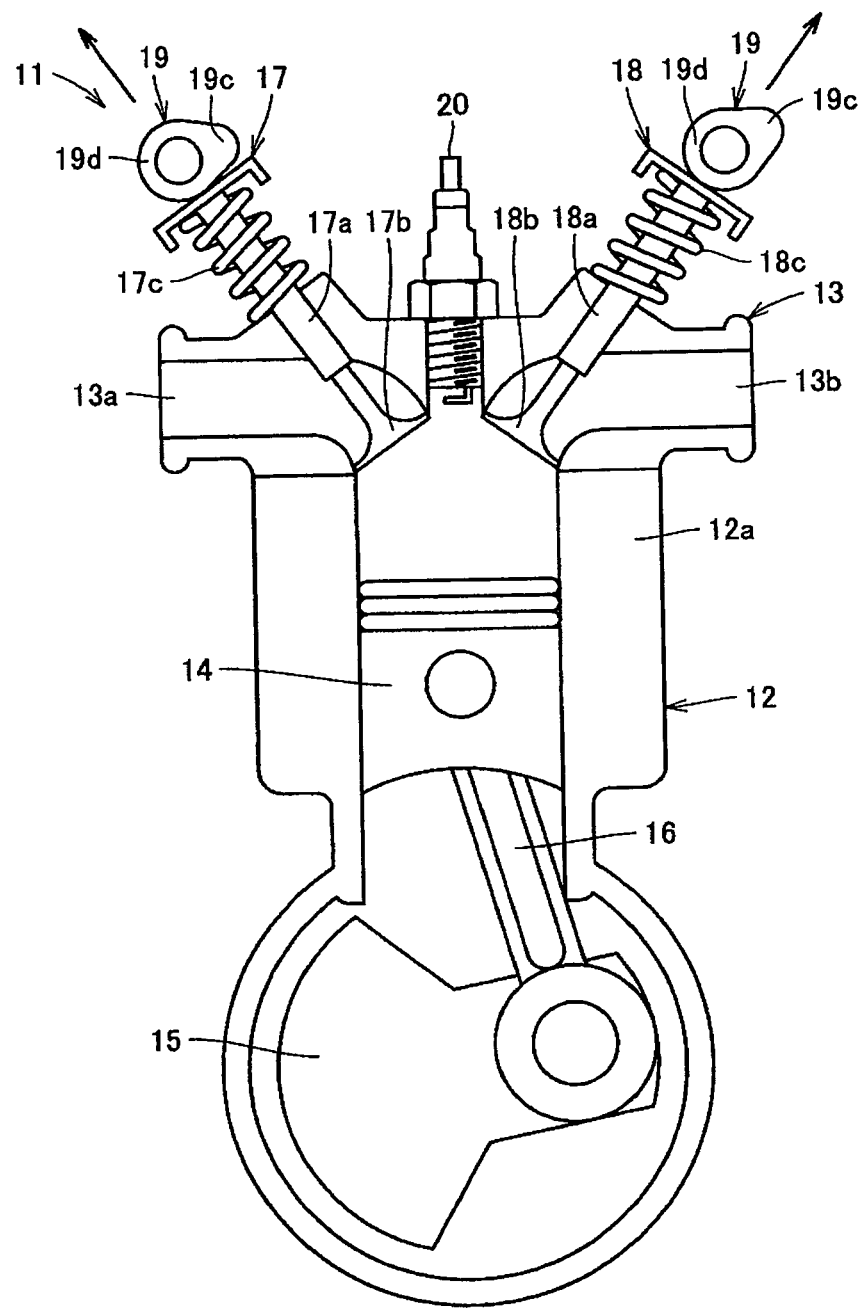
FIG. 47 is a sectional view showing one cylinder of an internal combustion engine according to one embodiment of the present invention.
Figure 48:
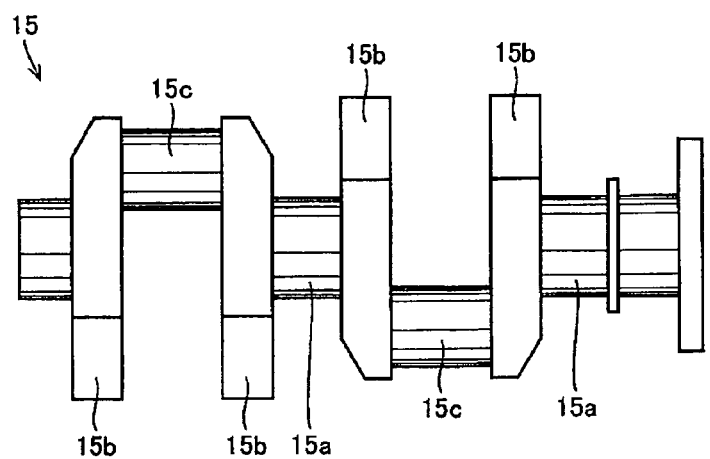
FIG. 48 is a view showing a crank shaft employed in the internal combustion engine shown in FIG. 47.
Figure 49:
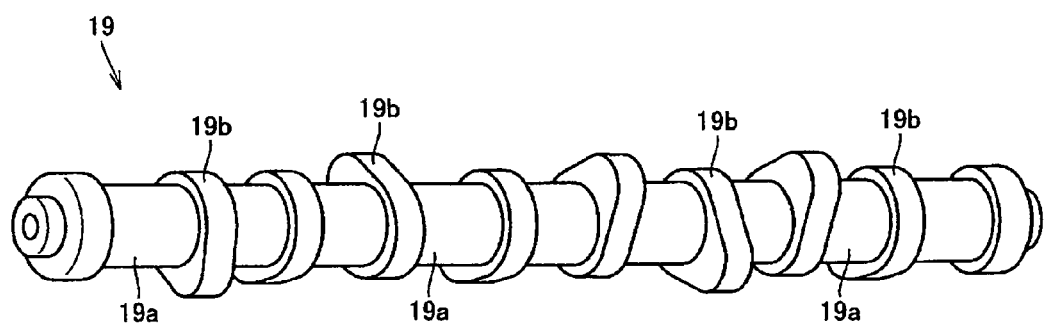
FIG. 49 is a view showing a cam shaft employed in the internal combustion engine shown in FIG. 47.
Figure 50:
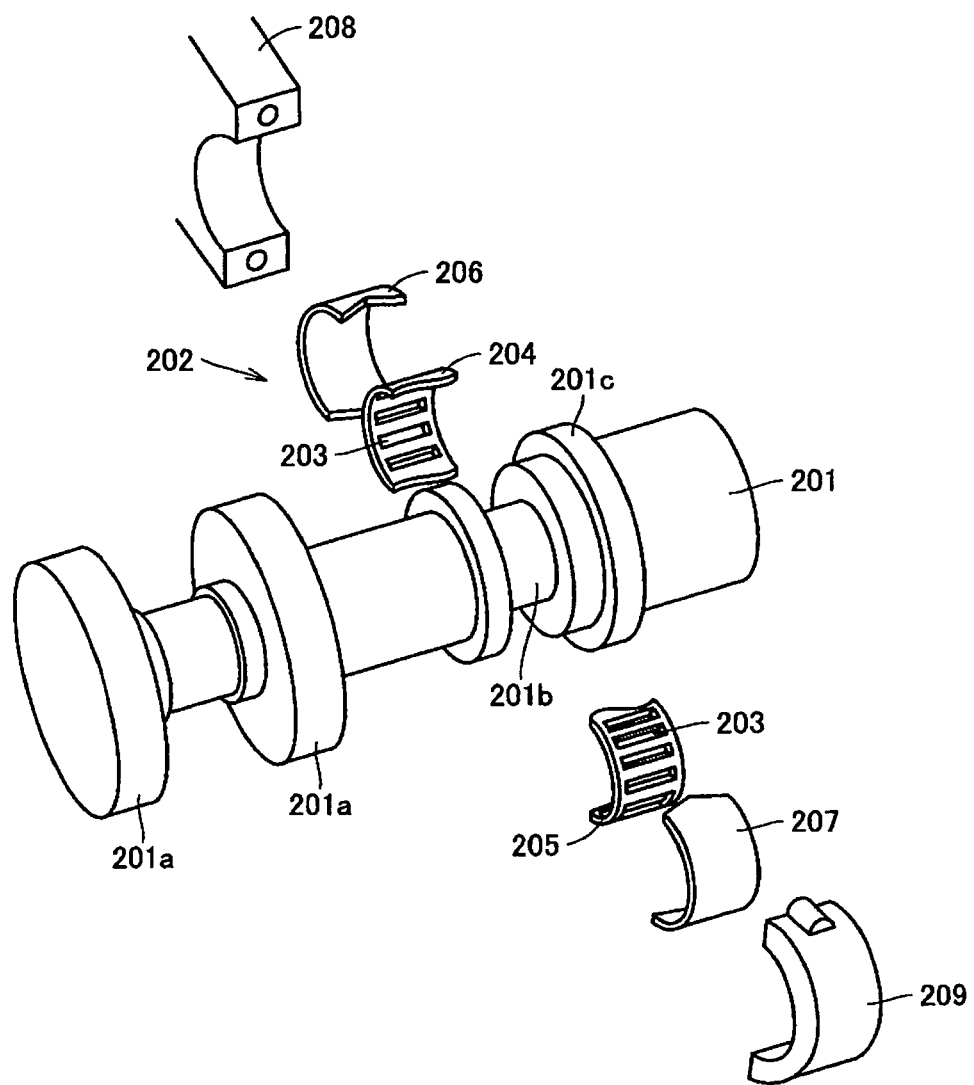
FIG. 50 is a view showing a conventional cam shaft support structure.
Figure 51:
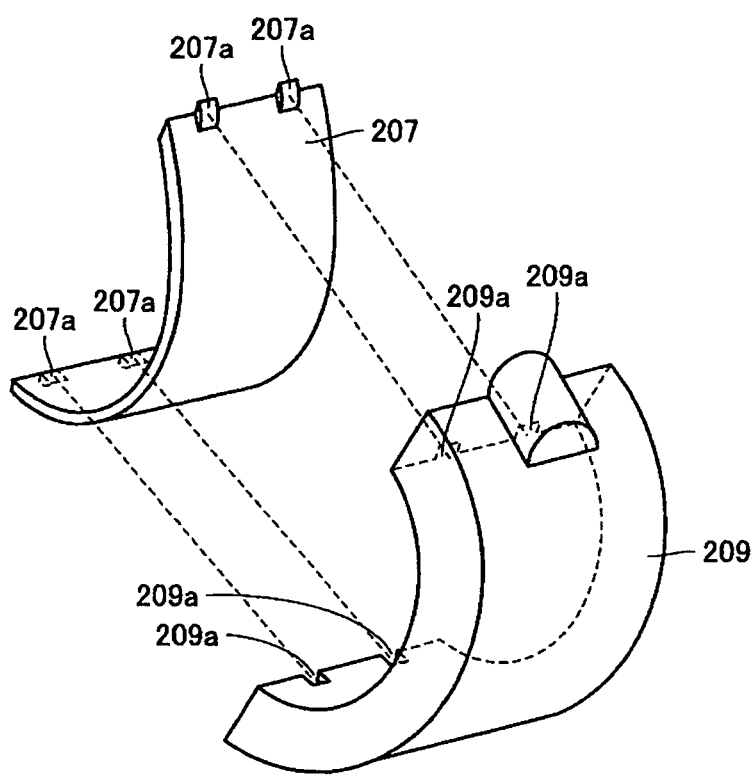
FIG. 51 is an enlarged view showing a race plate and a cap of a roller bearing shown in FIG. 50.

An internal combustion engine 11 according to one embodiments of the present invention will be described with reference to FIGS. 47 to 49 hereinafter. In addition, FIG. 47 is a sectional view showing one cylinder of the internal combustion engine 11 according to one embodiment of the present invention. FIG. 48 is a view showing a crank shaft 15 used in the internal combustion engine 11, and FIG. 49 is a view showing a cam shaft 19 used in the internal combustion engine 11.

First, referring to FIG. 47, the internal combustion engine 11 is a reciprocating engine comprising a housing including a cylinder block 12 and a cylinder head 13, a motion converting mechanism for converting the motion from a reciprocal motion to a rotary motion, an inlet/exhaust mechanism for inletting mixture gas and exhausting combustion gas, and a spark plug 20 as an ignition device.

The motion converting mechanism comprises a piston 14 housed in the cylinder block 12 and reciprocating in a cylinder 12a provided in the cylinder block 12, a crank shaft 15 connected to a transmission (not shown) through a flywheel (not shown) and a clutch (not shown), and a con rod 16 having one end connected to the piston 14 and the other end connected to the crank shaft 15 and converting the reciprocal motion of the piston 14 to the rotary motion of the crank shaft 15.

The inlet/exhaust mechanism comprises an inlet path 13a and an exhaust path 13b formed in the cylinder head 13 and continued to the cylinder 12a, an inlet valve 17 serving as a valve disposed between the cylinder 12a and the inlet path 13a, an exhaust valve 18 serving as a valve disposed between the cylinder 12a and the exhaust path 13b, and a cam shaft 19 controlling the opening and closing timings of the inlet valve 17 and the exhaust valve 18.

The inlet valve 17 includes a valve stem 17a, a valve head 17b provided at one side end of the valve stem 17a, and a valve spring 17c forcing the inlet valve 17 to close the exhaust path 13a, and the cam shaft 19 is connected to the other side end of the valve stem 17a. In addition, since the exhaust valve 18 has the same constitution as that of the inlet valve 17, its description will not be reiterated.

Referring to FIG. 48, the crank shaft 15 used in the internal combustion engine 11 has a shaft part 15a, a crank arm 15b, and a crank pin 15c for arranging the con rod 16 between the adjacent crank arms 15b. The shaft part 15a of the crank shaft 15 is rotatably supported by a needle roller bearing 21 according to one embodiment of the present invention as will be described below. In addition, the number of the crank pin 15c is the same as that of the cylinder of the internal combustion engine 11.

Referring to FIG. 49, the cam shaft 19 used in the internal combustion engine 11 has a shaft part 19a, and a plurality of cams 19b. The shaft part 19a is rotatably supported by the needle roller bearing 21 according to one embodiment of the present invention as will be described below. The cam shaft 19 is connected to the crank shaft 15 by a timing belt (not shown) and rotates as the crank shaft 15 rotates.

Since the cam 19b is connected to the inlet valve 17 or the exhaust valve 18, the number thereof is the same as the number of the valves 17 and 18. In addition, as shown in FIG. 47, the cam 19b includes a large diameter part 19c having a relatively large diameter and a small diameter part 19d having a relatively small diameter, and the plurality of cams 19b are arranged so that the positions of the large diameter parts 19c are shifted in the circumferential direction. Thus, the valves 17 and 18 connected to the plurality of cams 19b can be opened and closed at different timings.

In addition, the internal combustion engine 11 is a DOHC (Double Over Head Camshaft) type engine in which the cam shaft 19 is arranged on the upper side of the cylinder head 13 and on each side of the inlet valve 17 and the exhaust valve 18.

Next, the operation principle of the internal combustion engine will be described.

First, the internal combustion engine 11 is a four-cycle engine comprising four steps of an inlet step, a compression step, a combustion step and an exhaust step when it is assumed that a step in which the piston 14 moves between an uppermost position (top dead center) and a lowermost position (bottom dead center) is one step.

In the inlet step, the piston 14 moves from the top dead center to the bottom dead center while the inlet valve 17 is open and the exhaust valve 18 is closed. Thus, since the inner volume of the cylinder 12a (upper space of the piston 14) is increased and a pressure thereof is lowered, the mixture gas is supplied from the inlet path 13a into the cylinder 12a. In addition, the mixture gas is a mixture of air (oxygen) and atomized gasoline.

In the compression step, the piston 14 moves from the bottom dead end to the top dead end while the inlet valve 17 and the exhaust valve 18 are closed. Thus, the inner volume of the cylinder 12a is reduced and the inner pressure is increased.

In the combustion step, the spark plug 20 is ignited while the inlet valve 17 and the exhaust valve 18 are closed. Then, the compressed mixture gas is burned and expands rapidly, whereby the piston 14 is pulled down from the upper dead center to the bottom dead center. This force is transmitted to the crank shaft 15 through the con rod 16 as a rotary motion, whereby a driving force is generated.

In the exhaust step, while the inlet valve 17 is closed and the exhaust valve 18 is open, the piston 14 moves from the bottom dead center to the top dead center. Thus, the inner volume of the cylinder 12a is reduced and the combustion gas is discharged to the exhaust path 13b. In addition, after the piston 14 reaches the top dead center in this step, the cycle is returned to the inlet step.

In addition, in the above each step, the term "the inlet valve 17 is open" means the large diameter part 19c of the cam 19b abuts on the inlet valve 17 and the inlet valve 17 is pressed downward against the valve spring 17c, and the term "the inlet valve 17 is closed" means that the small diameter part 19d of the cam 19b abuts on the inlet valve 17 and the inlet valve 17 is pushed upward by the restoring force of the valve spring 17c. In addition, since the same is true on the exhaust valve 18, its description will not be reiterated.

In the above steps, the driving force is generated only in the combustion step and in other steps, the piston 14 is reciprocally moved by the driving force generated in the cylinder. Thus, in order to maintain the smooth rotation of the crank shaft 15, it is preferable that the timing of the combustion step is differentiated by the plurality of cylinders.

Next, a description will be made of the needle roller bearing 21 as a roller bearing, and a cam shaft support structure using the needle roller bearing 21 according to one embodiment of the present invention with reference to FIGS. 1 to 15. In addition, FIGS. 1 and 13 to 15 are views showing states before and after the cam shaft support structure according to one embodiment of the present invention is incorporated, and FIGS. 2 to 12 are views showing components of the needle roller bearing 21 according to one embodiment of the present invention.

Figure 1:
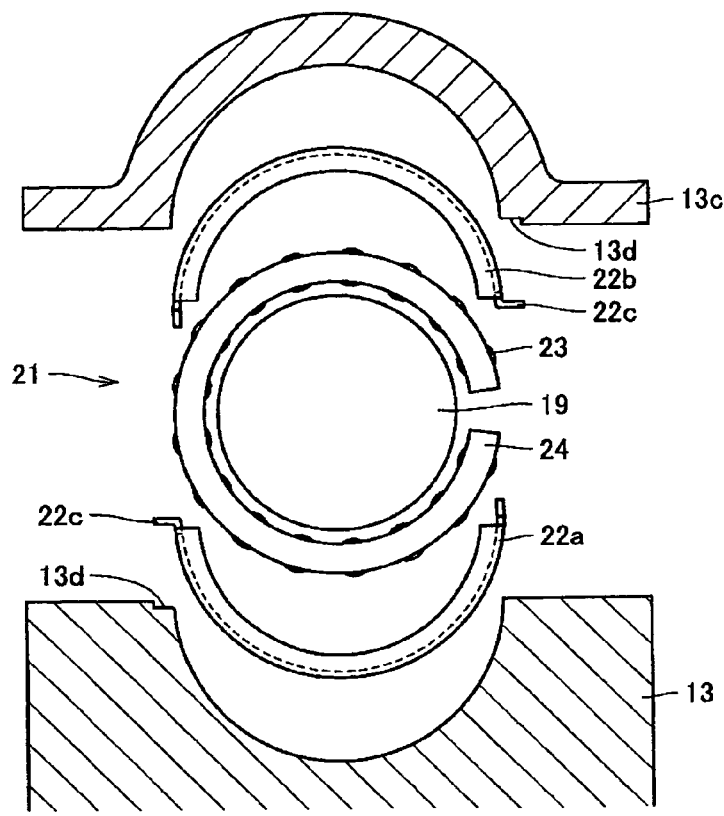
FIG. 1 is a view showing a state before a cam shaft support structure is incorporated according to one embodiment of the present invention.

First, referring to FIG. 1, the cam shaft support structure according to one embodiment of the present invention comprises the cam shaft 19, the cylinder head 13 and a bearing cap 13c as a housing for holding the cam shaft 19, and the needle roller bearing 21 supporting the cam shaft 19 rotatably with respect to the housing.

The needle roller bearing 21 has an outer ring 22 formed by connecting arc-shaped outer diameter members 22a and 22b in a circumferential direction, a plurality of needle rollers 23 arranged along the inner diameter surface of the outer ring 22, and a retainer 24 having a split line provided at one position on the circumference and extending in a bearing axial direction, and retaining the distance between the plurality of needle rollers 23.

In addition, as the bearing supporting the cam shaft 19, the needle roller bearing 21 is employed in general. According to the needle roller bearing 21, since the needle roller 23 and a track surface are linearly in contact with each other, high-load capacity and high rigidity are provided in spite of its small bearing projected area. Therefore, while the load capacity is maintained, the thickness in the radial direction of the shaft part 19b can be reduced.

Figure 2:
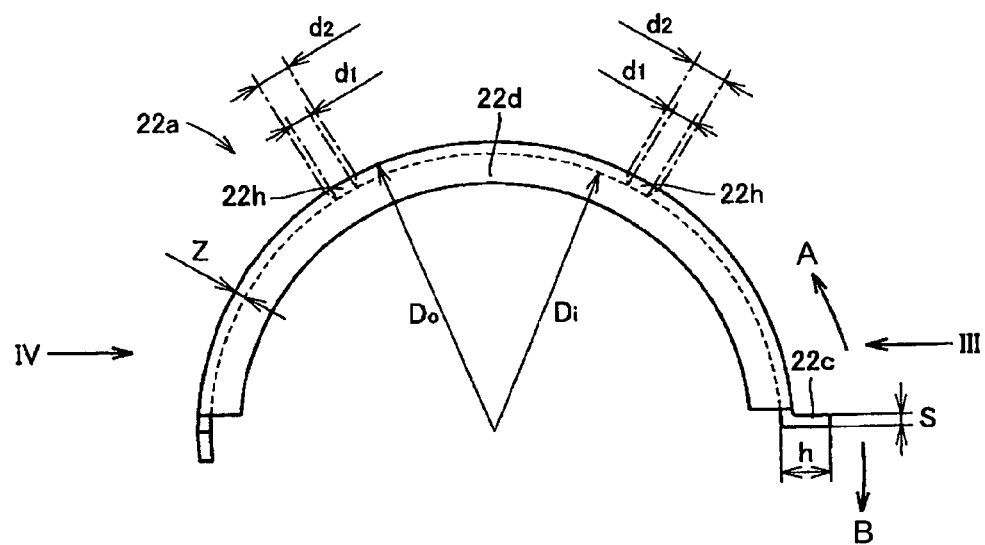
FIG. 2 is a view showing an outer ring member of a roller bearing shown in FIG. 1.
Figure 3:
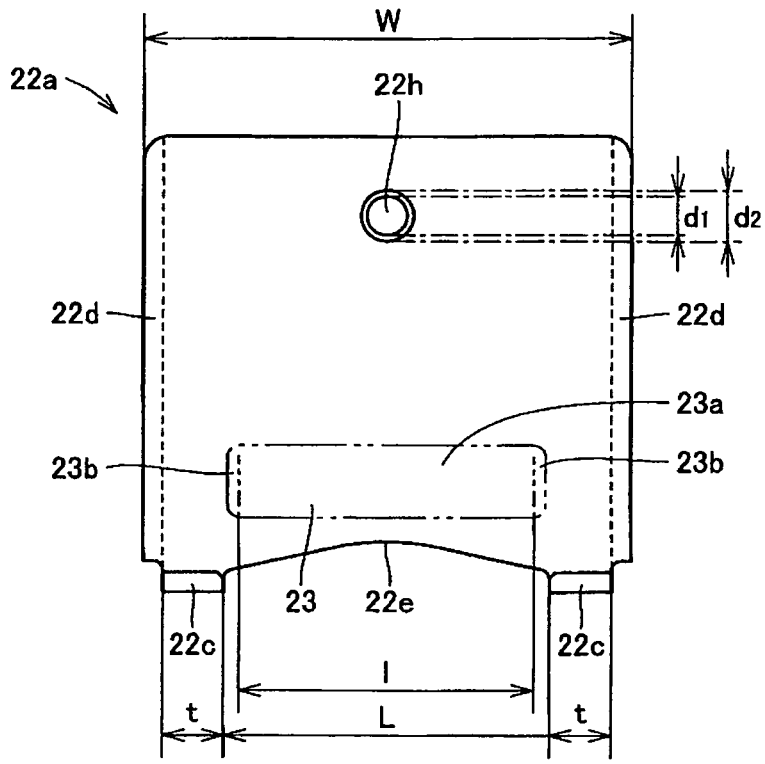
FIG. 3 is a view taken from III direction in FIG. 2.
Figure 4:
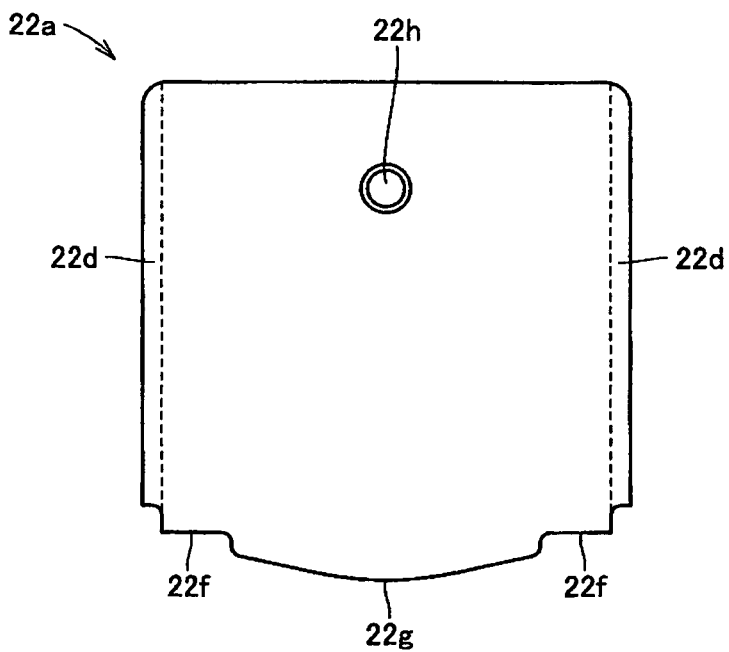
FIG. 4 is a view taken from IV direction in FIG. 2.
Figure 8:
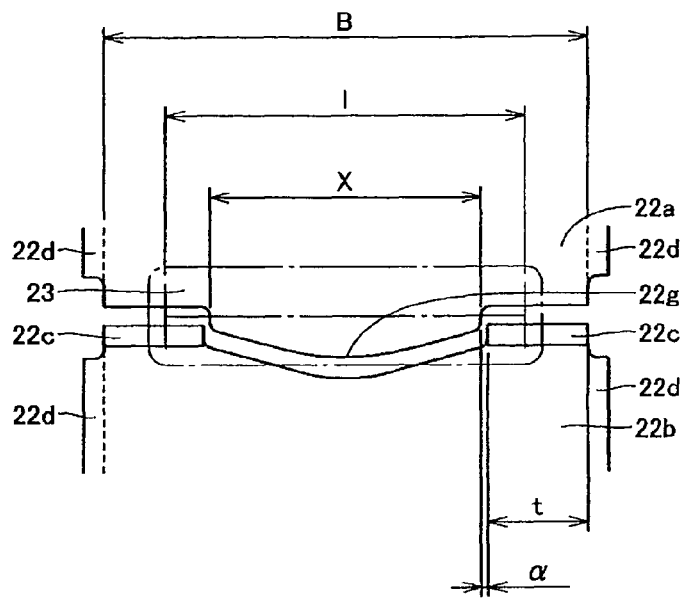
FIG. 8 is a view showing the abutment part of the outer ring members of the roller bearing shown in FIG. 1, in which a contact state between a root part of the projection part of the outer ring member and a roller is shown.
Figure 9:
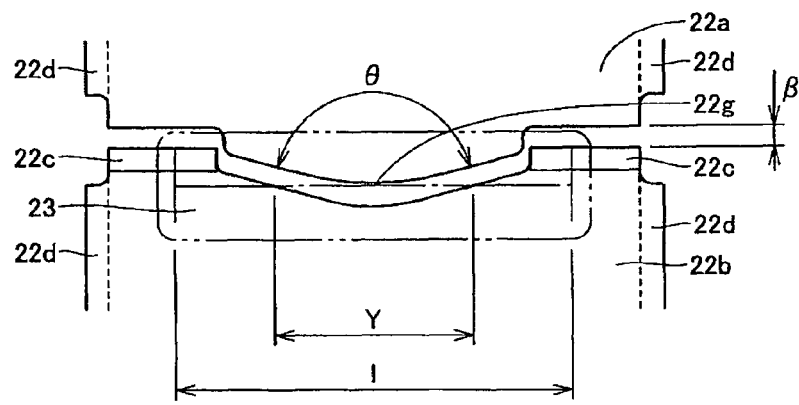
FIG. 9 is a view showing the abutment part of the outer ring members of the roller bearing shown in FIG. 1, in which a contact state between a tip end of the projection part of the outer ring member and a roller is shown.
Figure 10:
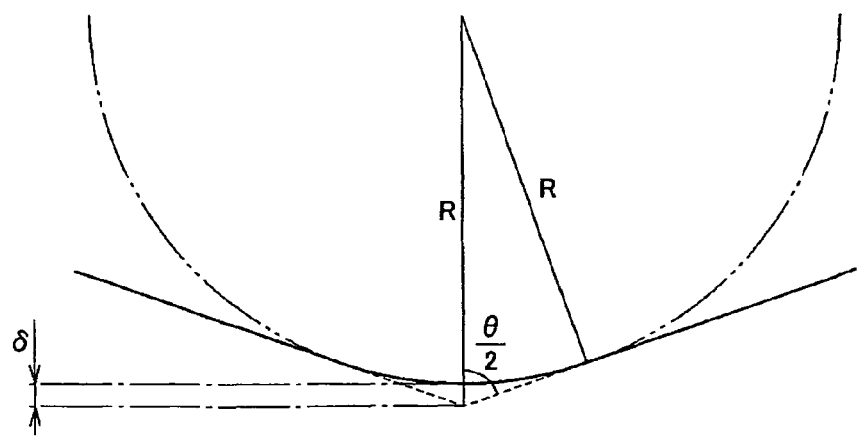
FIG. 10 is an enlarged view showing the tip end part of the projection part in FIG. 9.

The outer diameter member 22a will be described with reference to FIGS. 2 to 10. In addition, FIG. 2 is a side view showing the outer diameter member 22a, FIG. 3 is a view taken from III direction in FIG. 2, FIG. 4 is a view taken from IV direction in FIG. 2, FIGS. 5 to 7 are enlarged views showing flange parts 22d of the outer diameter members 22a and 22b, and FIGS. 8 to 10 are views of the abutment part between the outer diameter members 22a and 22b taken from the radial direction. In addition, since the outer diameter member 22b has the same configuration as that of the outer diameter member 22a, its description will not be reiterated.

First, referring to FIG. 2, the outer diameter member 22a has a semicircular configuration having a center angle of 180° and includes an engagement click 22c provided one side end of both side ends in the circumferential direction (one circumferential side end) and bent to the radial outer side as an engagement member so as to engage with the cylinder head 13, and the flange part 22d projecting from axial both ends to the radial inner side to regulate the movement of the retainer 24 in the axial direction. Thus, the two outer diameter members 22a and 22b are connected in the circumferential direction to form the annular outer ring 22. In addition, the axial center of the inner diameter surface of the outer ring 22 functions as a track surface of the needle roller 23.

In addition, referring to FIG. 3, two engagement clicks 22c are provided at the axial both ends, at one circumferential side end of the outer diameter member 22a, and a roughly V-shaped recession part 22e recessed in the circumferential direction is formed between the two engagement clicks 22c. In addition, the two engagement clicks 22c are arranged at axial both ends, not at the axial center serving as the track surface of the outer diameter member 22a, and are arranged on a line parallel to the rotation axis of the needle roller bearing 21. Preferably, a length L between the two engagement clicks 22c is set so as to be longer than an effective length l of the needle roller 23. In addition, the term "effective length of the roller" in this specification means the length of the roller except for chamfered parts at both ends.

In addition, referring to FIG. 4, the other circumferential side end of the outer diameter member 22a has two flat parts 22f each having the same width as the axial width of the engagement click 22c, at the axial both ends, and a roughly V-shaped projection part 22g having an arc-shaped tip end and projecting in the circumferential direction, between the two flat parts 22f. In addition, the recession part 22e receives the projection part 22g of the adjacent outer diameter member when the outer diameter members 22a and 22b are connected in the circumferential direction.

Here, a certain gap is formed at the abutment part of the adjacent outer diameter members 22a and 22b in the circumferential direction and the axial direction in view of a dimensional change due to the thermal expansion and the like of the outer diameter members 22a and 22b. Therefore, when the abutting circumferential ends of the outer diameter members 22a and 22b abut on each other parallel to the shaft direction, a groove extending in the axial direction is formed at the abutment part. In this case, the needle roller 23 is fit in the groove at the abutment part at the time of the bearing rotation, which hinders the smooth rotation of the needle roller 23.

Thus, when the configuration of the abutment part is roughly V shaped, the needle roller 23 can smoothly rotate. In addition, the configuration of the abutment part of the outer diameter members 22a and 22b is not limited to the roughly V shape, it may be any configuration as long as the needle roller 23 can smoothly rotate, such as a roughly W shape.

Furthermore, referring to FIG. 2, in the arc-shaped part of the outer diameter member 22a, when it is assumed that the thickness of the track surface is z, and the thickness of the engagement click 22c is s, they are to be set to satisfy that $s/z \geq 0.7$. Since the engagement click 22c is formed such that the circumferential end of the outer diameter member 22a is bent to the radial outer side, the thickness is reduced to some extent at the time of processing. However, when the thickness s becomes too thin, the engagement click 22c cannot maintain necessary strength, so that it cannot surely position the outer diameter member 22a with respect to the housing. In addition, in the case where the outer diameter member 22a is formed of a steel plate having a uniform thickness as a starting material, the above relation becomes $0.7 \leq s/z \leq 1.1$.

In addition, when it is assumed that the outer diameter dimension of the outer diameter member 22a is Do, a projection amount of the engagement click 22c from the outer diameter surface of the outer diameter member 22a is h, they are to be set to satisfy that $0.03 \leq h/Do \leq 0.3$. When the projection amount h of the engagement click 22c is too small, the engagement with the housing is not sufficient and the outer diameter member 22a cannot be surely positioned with respect to the housing. Meanwhile, when the projection amount of the engagement click 22c is too large, the engagement click 22c is likely to be damaged in the case where a moment load is applied to the tip end of the engagement click 22c. Thus, the projection amount of the engagement click 22c is desired to be within the above range.

Furthermore, referring to FIG. 3, when it is assumed that the axial width dimension of the outer diameter surface of the outer diameter member 22a is W and the total axial width t of the all engagement click 22c is $t_{total}$, they are set to satisfy that $0.1 \leq t_{total} \leq 0.5$. When the total $t_{total}$ of the axial width of the engagement click 22c is too large, the projection part 22g and the recession part 22e cannot have enough size, so that the needle roller 23 could not smoothly rotate. Therefore, when the ratio of the projection part 22g and the recession part 22e at the circumferential end of the outer diameter member 22a is set to be 50% and above of the axial width dimension W of the outer diameter member 22a, the needle roller 23 passing through the abutment part of the outer diameter members 22a and 22b can keep rotating smoothly.

Meanwhile, when the axial width t of the engagement click 22c is too small, the engagement click 22c cannot have necessary strength, so that the outer diameter member 22a cannot be surely positioned with respect to the housing. Therefore, when it is set such that $t_{total}/W \geq 0.1$, preferably when the axial width dimension t of each engagement click 22c is such that $t/W \geq 0.1$ (when the two engagement clicks 22c are formed as shown in FIG. 3, $t_{total}/W \geq 0.2$), the engagement click 22c can have the necessary strength.

Furthermore, referring to FIGS. 3 and 4, an oil hole 22h penetrating from the radial outside to the radial inside is provided in the outer diameter surface of the outer diameter member 22a. The oil hole 22h is provided at a position corresponding to an oil path (not shown) provided in the housing, and lubricant oil is supplied from it into the needle roller bearing 21. In addition, the size, position and number of the oil hole 22h depend on the size and position and number of the oil path provided in the housing.

Here, the oil hole 22h has an opening in the outer diameter surface and the inner diameter surface of the outer diameter member 22a, and when it is assumed that the diameter on the inner diameter surface side is $d_1$, and the diameter on the outer diameter surface side is $d_2$, they are set such that $d_1 \leq d_2$. Thus, the lubricant oil can flow from the oil hole 22h into the bearing smoothly.

In addition, referring to FIG. 2, the diameter $d_1$ on the inner diameter surface side of the oil hole 22h is set to satisfy $d_1/Di < 0.2$ where Di is the inner diameter dimension of the outer diameter member 22a. Thus, the lubricating performance of the needle roller bearing 21 can be improved and the strength of the outer diameter member 22a can be prevented from being lowered.

Furthermore, referring to FIG. 3, even when the needle roller 23 moves to the maximum in the axial direction, the oil hole 22h is always positioned so as to be opposed to a rolling surface 23a of the needle roller 23, and the diameter $d_1$ on the inner diameter side of the oil hole 22h is set so as to satisfy that $d_1/l < 0.5$ where l is the effective length of the needle roller 23. Thus, since the oil hole 22h does not hinder the rotation of the needle roller passing on the oil hole 22h, the needle roller of the needle roller bearing 21 can smoothly rotate.

In addition, the rolling surface 23a of the needle roller designates the abutment part between the axial center of the needle roller 23 and the inner diameter surface of the outer diameter member 22a, and it corresponds to a range of the effective length l. In addition, chamfered parts 23b that do not abut on the inner diameter surface of the outer diameter member 22a is provided on axial both ends of the rolling surface 23a.

Figure 5:
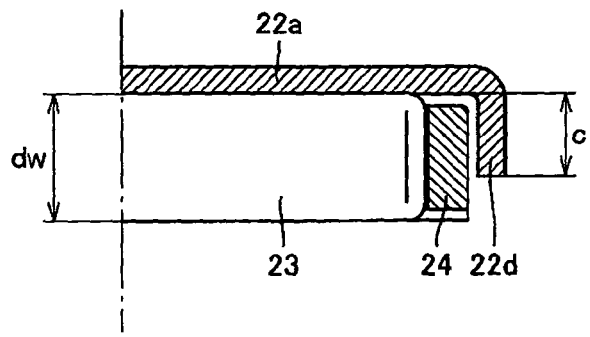
FIG. 5 is a view showing a projection height of a flange part provided in the outer ring member shown in FIG. 2.

In addition, referring to FIG. 5, a certain gap has to be provided between the flange part 22d and the rotation shaft (not shown) in view of thermal expansion and the like at the time of bearing rotation. Meanwhile, the projection amount of the flange part 22d is small, the axial movement of the retainer 24 cannot be regulated and the discharge amount of the lubricant oil from the gap between the outer diameter member 22a and the rotation shaft (not shown) is increased.

Thus, when it is assumed that the roller diameter of the needle roller 23 is dw, and the projection amount of the flange part 22d from the inner diameter surfaces of the outer diameter members 22a and 22b is c, the flange part 22d is to be formed so as to satisfy that $0.5 \leq c/dw \leq 0.9$.

Figure 6:
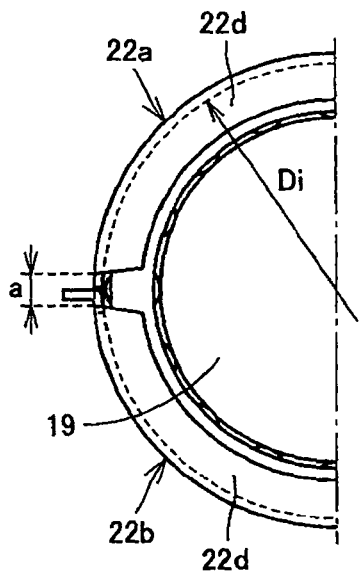
FIG. 6 is a view showing one example of an abutment part when the outer ring members shown in FIG. 2 abut on each other.

Furthermore, referring to FIG. 6, when the outer diameter members 22a and 22b abut on each other, a certain gap is provided between the opposed end faces of the flange parts 22d of the outer diameter members 22a and 22b in view of the thermal expansion and the like at the time of the bearing rotation. Meanwhile, this gap is preferably small in order to prevent the lubricant oil from escaping.

Thus, when it is assumed that the inner diameter dimension of the outer ring 22 is Di and the minimum gap between the opposed end faces of the flange parts 22d of the adjacent outer diameter members 22a and 22b is a, the flange part 22d is formed so as to satisfy that $0 < a/Di < 0.2$.

When the flange part 22d has the above constitution, it can appropriately regulate the axial movement of the retainer 24 and prevent the lubricant oil from flowing out from the bearing inside, so that the needle roller bearing 21 is superior in lubricating property. Furthermore, when the discharge amount of the lubricant oil is reduced, since an oil pump (not shown) put outside can be miniaturized, the whole equipment can be compact.

Figure 7:
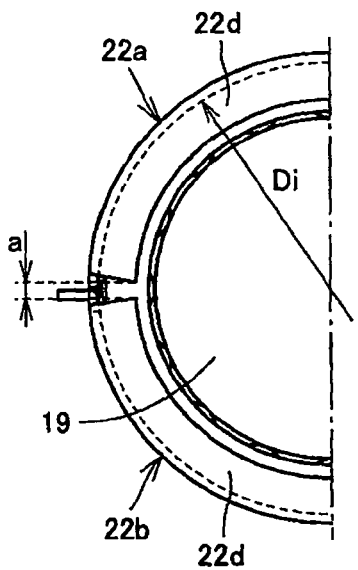
FIG. 7 is a view showing another example of an abutment part when the outer ring members shown in FIG. 2 abut on each other.

In addition, although the gap at the tip ends of the opposed flange parts 22d is the smallest in the embodiment as shown in FIG. 6, the present invention is not limited to this and the gap may be the same from the tip end to the root or as shown in FIG. 7, the gap at the root part may be the smallest. Since the lubricant oil in the bearing is moved toward the diameter direction by centrifugal force due to the bearing rotation, when the gap at the root part positioned radial outer side is small, the lubricant oil can be effectively prevented from discharging outside.

Next, a description will be made of various kinds of dimensional relations at the abutment part of the outer diameter members 22a and 22b by referring to FIGS. 8-10. As described above, the gap between the abutment part of the outer diameter members 22a and 22b has to be provided in the circumferential direction and axial direction to some extent. However, in order to implement smooth rotation of the needle roller 23 passing through the abutment part of the outer diameter members 22a and 22b, 50% or more of the effective length of the needle roller 23 has to be in contact with the inner diameter surface of the outer diameter members 22a and 22b. Therefore, it is necessary to determine each dimension within a range satisfying the above condition.

First, referring to FIG. 8, when it is assumed that the effective length of the needle roller 23 is l, the axial width of the inner diameter surface of the outer diameter member 22a is B, the axial width of the engagement click 22c is t, the axial gap between the adjacent outer diameter members 22a and 22b at the root part of the projection part 22g is α, and the contact length between the inner diameter surface of the outer diameter member 22a and the needle roller 23 at the root part of the projection part 22g is X, the following relation is to be established.

$$X = \{B - 2(t + \alpha)\} \qquad \text{[Formula 1]}$$

Next, referring to FIGS. 9 and 10, when it is assumed that the effective length of the needle roller 23 is l, the center angle of the tip end of the projection part 22g is θ, the curvature radius of the arc of the tip end of the projection part 22g is R, the circumferential gap between the adjacent outer diameter members 22a and 22b is β, and the non-contact length between the inner diameter surface of the outer diameter member 22a and the needle roller 23 at the tip end of the projection part 22g is Y, the following relation is to be established.

$$Y = 2(\beta + \delta)\tan\frac{\theta}{2} \qquad \text{[Formula 2]}$$

In addition, δ is a circumferential gap generated when the tip end of the projection part 22g is formed into the arc shape, and it can be calculated based on the center angle θ of the tip end of the projection part 22g and the curvature radius R as shown in FIG. 10 by the following formula.

$$\delta = R\left(\frac{1}{\sin\frac{\theta}{2}} - 1\right) \qquad \text{[Formula 3]}$$

Here, since it is necessary to satisfy the relation that X/1≧0.5 and Y/1<0.5 in order to implement smooth rotation of the needle roller 23, when each formula is assigned, the effective length l of the needle roller 23 is calculated as follows. When one of them, preferably both of them are satisfied, the needle roller 23 of the needle roller bearing 21 can smoothly rotate.

$$l \leq 2\{B - 2(t + \alpha)\} \qquad \text{[Formula 4]}$$

$$l > 4\left\{R\left(\frac{1}{\sin\frac{\theta}{2}} - 1\right) + \beta\right\}\tan\frac{\theta}{2} \qquad \text{[Formula 5]}$$

The outer diameter member 22a having the above constitution is a shell-type outer ring formed by pressing a steel plate such as carbon steel. More specifically, the whole configuration of the outer diameter member 22a, the engagement click 22c and the flange part 22d are pressed and subjected to a thermal treatment in order to obtain predetermined mechanical properties such as hardness, whereby a completed product is provided.

Figure 11:
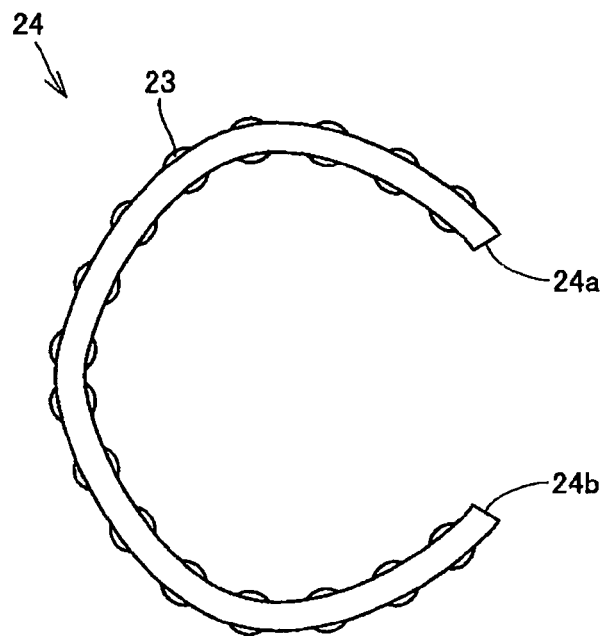
FIG. 11 is a side view showing a retainer of the roller bearing shown in FIG. 1.
Figure 12:
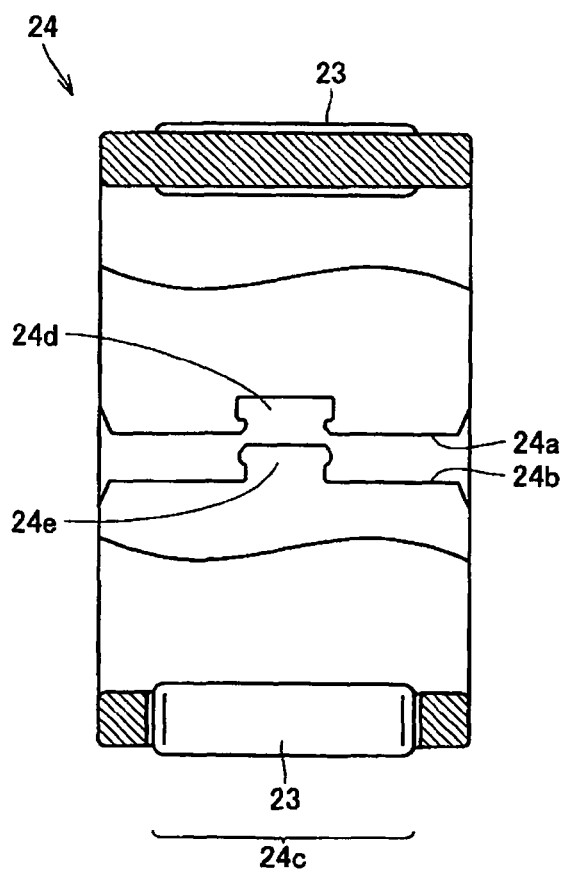
FIG. 12 is a partial sectional view showing a split part of the retainer shown in FIG. 11.

Next, the retainer 24 will be described with reference to FIGS. 11 and 12. In addition, FIG. 11 is a side view showing the retainer 24 and FIG. 12 is a partially sectional view showing a split part of the retainer 24. The retainer 24 has a roughly C shape in which a split line extending in the axial direction is provided at one position on the circumference, and pockets 24c for housing the needle rollers are provided at the same intervals in the circumferential direction. In addition, the retainer 24 is formed of a resin material by injection molding.

In addition, a recession part 24d is provided at one circumferential cut end face 24a of the split part, and a projection part 24e corresponding to the recession part 24d is provided at the other circumferential cut end face 24b, and when the recession part 24d engages with the projection part 24e, the annular retainer 24 is provided. In addition, according to this embodiment, the width of the projection part 24e at the tip end is set so as to be larger than that at the root part, and the width of the recession part 24d at an opening part is set so as to be smaller than that at an innermost part. Thus, the recession part 24d and the projection part 24e surely engage with each other.

According to the needle roller bearing 21 having the above constitution, since the engagement click 22c engages with the housing, the outer ring can be surely prevented from rotating in the housing during the bearing rotation. In addition, according to the engagement click 22c, since the circumferential ends of the outer diameter members 22a and 22b are bent toward the radial outer side by the bending process, the track surface can be kept in a smooth state. Thus, the needle roller 23 can smoothly rotate on the track surface.

In addition, since the engagement click 22c is provided at a position apart from the track surface of the outer diameter member 22a, the effect of the small deformation of the outer diameter members 22a and 22b due to the bending process of the engagement click 22c, on the rotation of the needle roller 23 can be minimized. As a result, the rotation of the needle roller 23 can become smoother.

Furthermore, since the oil hole 22h is provided in the outer diameter members 22a and 22b, the lubricant oil flowing into the bearing is increased, and since the projection amount of the flange part 22d is set within the predetermined range, the discharge amount of the lubricant oil from the inside of the bearing can be reduced. Thus, the needle roller bearing 21 can be superior in lubricating performance.

Next, a process for incorporating the needle roller bearing 21 in the cam shaft 19 will be described with reference to FIGS. 1 and 13 to 15.

First, the needle roller 23 is incorporated in the pocket 24c of the retainer 24. Then, the split part of the retainer 24 is elastically enlarged and mounted on the cam shaft 19. Then, the recession part 24d and the projection part 24e engage with each other so that the retainer 24 is fixed.

Then, the one outer diameter member 22a, the cam shaft 19 provided with the retainer 24, the other outer diameter member 22b, and bearing cap 13c are sequentially incorporated on the cylinder head 13, and then the cylinder head 13 and the bearing cap 13c are fixed by a bolt and the like. At this time, they are arranged such that the recession part 22e of the outer diameter member 22a abuts on the projection part 22g of the outer diameter member 22b, and the projection part 22g of the outer diameter member 22a abuts on the recession part 22e of the outer diameter member 22b.

The engagement click 22c of the outer diameter member 22a is arranged so as to engage with an engagement groove 13d provided in the cylinder head 13 to abut on the bearing cap 13c, and the engagement click 22c of the outer diameter member 22b is arranged so as to engage with an engagement groove 13d provided in the bearing cap 13c to abut on the cylinder head 13. Thus, the outer diameter members 22a and 22b are prevented from rotating in the housing during the bearing rotation.

Here, the abutment surface between the cylinder head 13 and the bearing cap 13c is parallel to the axial direction of the cam shaft 19, that is, the rotation axis of the bearing in general. Thus, when the two engagement clicks 22c provided in the circumferential end of each of the outer diameter members 22a and 22b are arranged so as to be parallel to the rotation axis of the needle roller bearing 21, the engagement click 22c can engage with the space between the cylinder head 13 and the bearing cap 13c.

Figure 13:
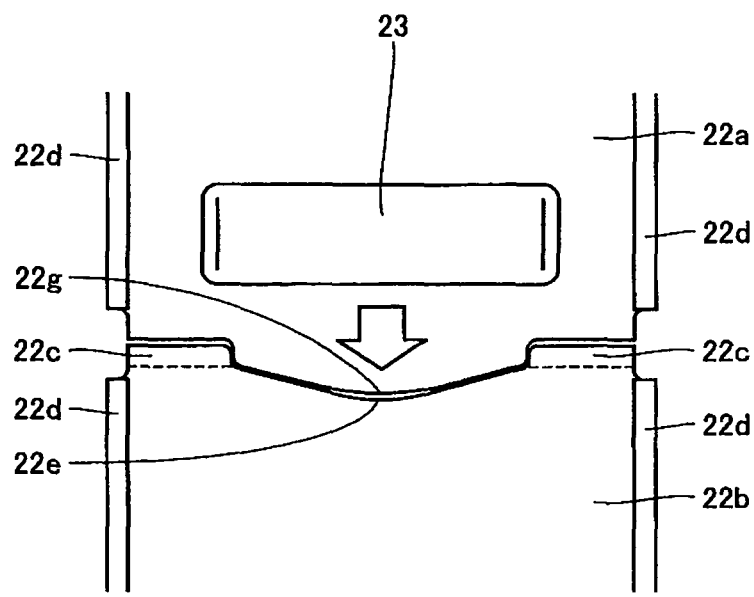
FIG. 13 is an enlarged view showing the abutment part when the outer ring members shown in FIG. 2 abut on each other.
Figure 14:
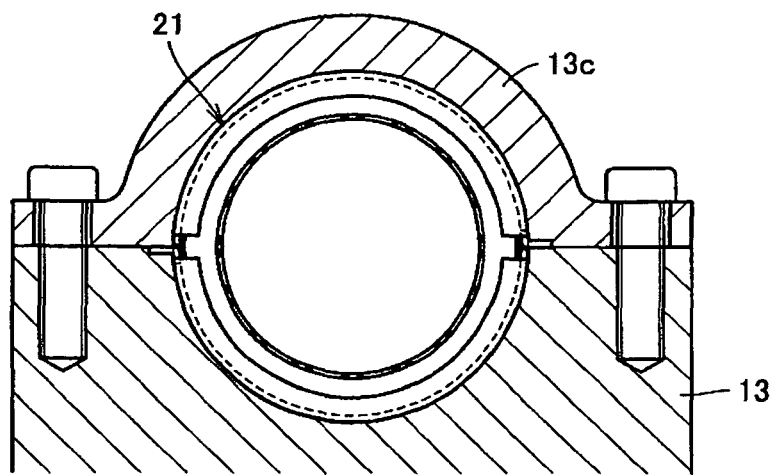
FIG. 14 is a sectional view showing a state after the cam shaft support structure shown in FIG. 1 is incorporated, taken from the axial direction.
Figure 15:
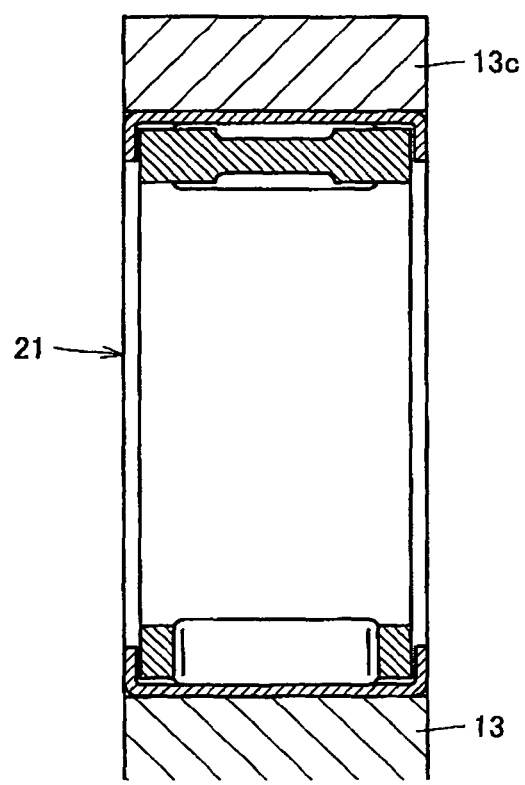
FIG. 15 is a sectional view showing a state after the cam shaft support structure shown in FIG. 1 is incorporated, taken from the radial direction.

In addition, referring to FIG. 13, the needle roller bearing 21 is arranged such that the rotation direction of the cam shaft 19, that is, the revolution direction of the needle roller 23 coincides with the projection direction of the projection parts 22g of the outer diameter members 22a and 22b. Thus, the needle roller 23 can rotate smoothly.

When the revolution direction of the needle roller 23 is opposite to the projection direction of the projection parts 22g of the outer diameter members 22a and 22b, the needle roller 23 collides against the tip end of the projection part 22g of the outer diameter members 22a or 22b, which could cause vibration and the damage of the needle roller 23.

According to the above assembling process, since the cam shaft 19, the outer ring 22, the retainer 24 and the housing are arranged concentrically, the needle roller 23 of the needle roller bearing 21 can stably rotate. In addition, according to the needle roller bearing 21 having the above constitution, since the outer ring 22 is split into the two outer diameter members 22a and 22b, and the retainer is split at one circumferential position, it can be mounted from the radial direction of the supporting part, so that it can be employed as the bearing supporting the shaft part 19b of the cam shaft 19.

In addition, since the outer diameter members 22a and 22b try to rotate in the direction opposite to the rotation direction of the cam shaft 19, a load in the same direction as the rotation direction of the cam shaft 19 is applied from the housing to the engagement click 22c as its reaction force. Here, even when a high load is applied to the engagement click 22c in a backward direction of the circumferential direction of the outer diameter member 22a (shown by A in FIG. 2), the engagement click 22c is not likely to be damaged, but when a load is applied in the opposite direction thereof (shown by B in FIG. 2), it could be damaged.

Thus, when the needle roller bearing 21 is arranged such that the rotation direction of the cam shaft coincides with the projection direction of the projection parts 22g of the outer diameter members 22a and 22b, the engagement click 22c is provided at the circumferential end of the recession part 22e, and the engagement click 22c can be prevented from being damaged and the outer diameter members 22a and 22b can be surely positioned.

Furthermore, it is preferable that when the cam shaft 19 is circumferentially divided into a load region and a non-load region, the abutment part of the outer diameter members 22a and 22b is arranged at the non-load region. The abutment part between the outer diameter members 22a and 22b is spaced in the circumferential direction and axial direction in view of the expansion due to temperature rise. Therefore, when the abutment part is arranged in the load region, the smooth rotation of the needle roller 23 passing through the abutment part could be hindered.

In addition, the term "load region" in this specification designates a region in which a relatively high load is applied in the circumferential direction of the outer diameter members 22a and 22b. In addition, the term "non-load region" designates a region in which only a relatively low load is applied in the circumferential direction of the outer diameter members 22a and 22b.

It is to be noted that since the oil hole 22h has to be arranged at the position corresponding to an oil path provided in the housing, it cannot be always arranged in the non-load region of the cam shaft 19. Thus, even when the oil hole 22h is arranged in the load region, the smooth rotation of the needle roller 23 can be maintained by satisfying at least one, preferably both of $d_1/Di<0.2$ and $d_1/l<0.5$.

Although the case where the needle roller bearing 21 is used as the bearing supporting the cam shaft 19 has been described in the above embodiment, the present invention can be also applied to other roller bearings such as a cylindrical roller bearing and a rod roller bearing.

In addition, although the needle roller bearing 21 comprises the outer ring 22 and the needle rollers 23 and the retainer 24 in the above embodiment, the present invention is not limited to this and can be applied to a full type roller bearing having no retainer 24.

In addition, although the outer ring 22 is split to the two outer diameter members 22a and 22b in the circumferential direction in the above embodiment, it may be split into any number. For example, three outer diameter members having a center angle of 120° may be connected in the circumferential direction to form an outer ring. Furthermore, a plurality of outer diameter members having different center angles may be connected to form an annular outer ring. Similarly, any configuration is used for the retainer 24.

In addition, although the outer diameter member 22a in the above embodiment is the shell-type outer ring manufactured by pressing the steel plate, it may be a machined outer ring produced through a cutting process.

In addition, although the retainer 24 is the resin retainer that is high in production efficiency and high in elastic deformability in the above embodiment, it may be a machined retainer produced through a cutting process, or a pressed retainer produced by pressing a steel plate.

In addition, although the engagement click 22c is formed by bending the circumferential ends of the outer ring members 22a and 22b to the radial outer side in the above embodiment, it can be an engagement member having any configuration that can engage with the housing.

In addition, although the retainer 24 is the resin retainer that is high in production efficiency and high in elastic deformability in the above embodiment, it may be a machined retainer produced through a cutting process, or a pressed retainer produced by pressing a steel plate.

In addition, although the engagement click 22c in the above embodiment is provided at one circumferential side end of both side ends of each of the outer diameter members 22a and 22b, the engagement click 22c may be provided circumferential both side ends of the outer diameter member 22a and it may not be provided in the outer diameter member 22b. In addition, although the two engagement clicks 22c are provided at axial both ends in the above embodiment, at least one may be provided at any position. For example, it may be provided at the one axial side end, or may be provided at the axial center part.

In addition, although the flange part 22d according to the above embodiment is provided over the whole circumferential regions of the outer diameter members 22a and 22b, it may be partially provided at one part in the circumferential direction. In this case, although the position and number of the flange part can be optionally set, it is preferable that it is arranged in the non-load region when it is incorporated in the cam shaft 19.

In addition, the needle roller bearing 21 according to the above embodiment is used not only as the bearing for supporting the cam shaft 19 but also as the bearing for supporting the crank shaft and rocker shaft.

In addition, although the internal combustion engine 11 in the above embodiment is the DOHC type engine in which the cam shaft 19 is provided on the inlet valve 17 side and the exhaust valve 18 side and the cam 19b is directly connected to the valves 17 and 18, it may be a SOHC (Single Over Head Camshaft) type engine in which one cam shaft is connected to an inlet valve and an exhaust valve through a rocker arm, or may be OHV (Over Head Valve) type engine in which a cam shaft is arranged beside a crank shaft and connected to a valve through a push rod and a rocker arm.

Furthermore, the present invention can be applied not only to the internal combustion engine 11 according to the above embodiment and it may be applied to various kinds of internal combustion engines having a cam shaft. In addition, although the present invention can be applied to a single-cylinder internal combustion engine, it can be preferably applied to a bearing supporting a position in which the needle roller bearing 21 cannot inserted from the axial direction such as the shaft part 19b of the cam shaft 19 employed in a multiple-cylinder engine shown in FIG. 49.

Figure 16:
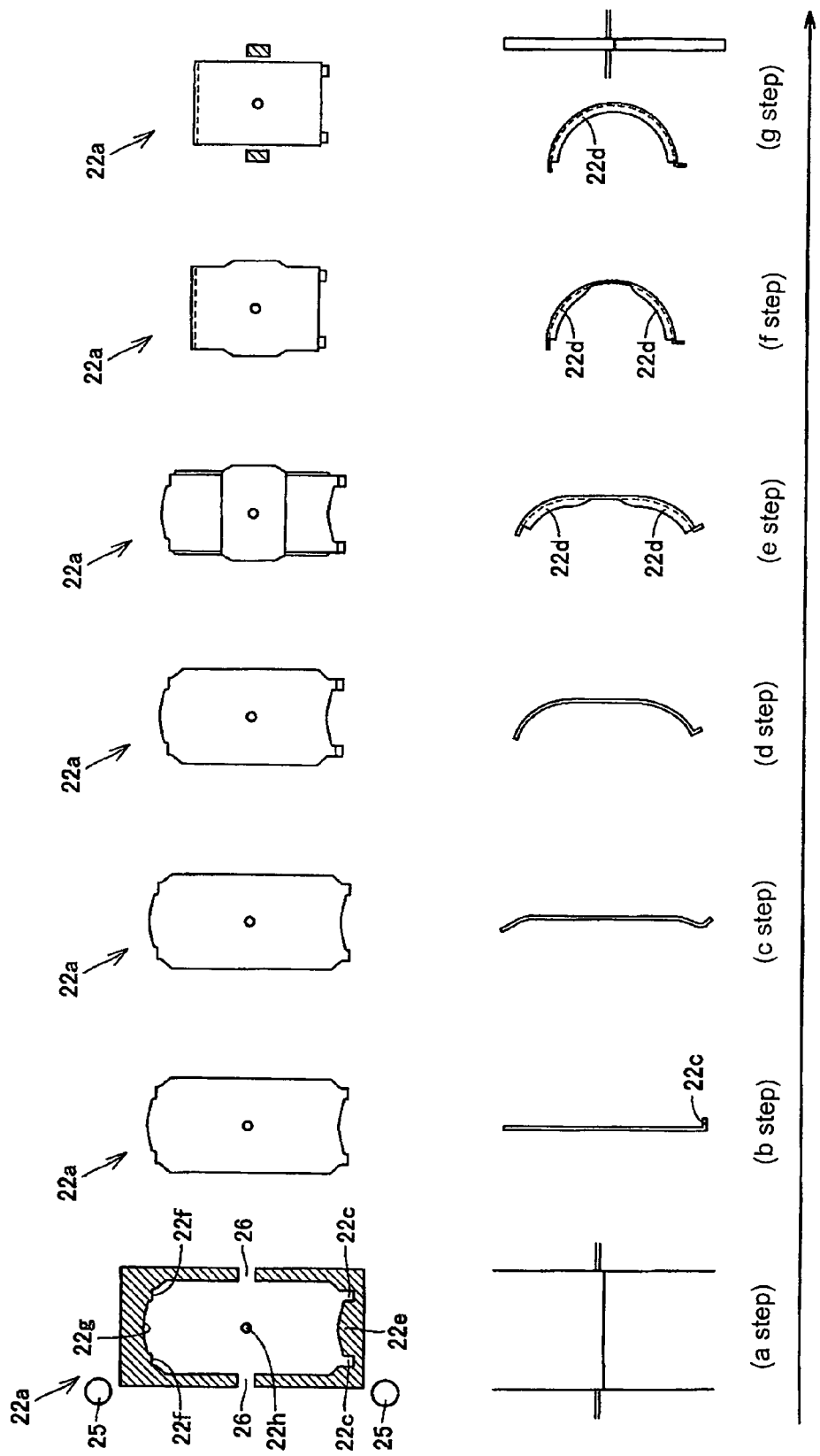
FIG. 16 is views showing one part of the production process of the outer ring member shown in FIG. 2, in which an upper part is a plan view and a lower part is a sectional view.

Next, the production method of the outer diameter member 22a according to one embodiment of the present invention will be described with reference to FIG. 16. FIG. 16 is views showing one part of the production process of the outer diameter member 22a in which an upper part shows a plan view and a lower part shows a sectional view. In addition, since the production method of the outer diameter member 22b is the same as that of the outer diameter member 22a, its description will not be reiterated.

First, carbon steel containing 0.15 wt % to 1.1 wt % of carbon is used as a starting material. More specifically, SCM415 or S50C containing 0.15 wt % to 0.5 wt % of carbon, or SAE1070 or SK5 containing 0.5 wt % to 1.1 wt % of carbon may be used.

In addition, according to carbon steel containing less than 0.15 wt % of carbon, a hardened layer is not likely to be formed by a quenching process, so that it is necessary to perform a nitrocarburizing process in order to obtain hardness required for the outer diameter member 22a. The nitrocarburizing process is high in plant cost as compared with the quenching process as will be described below, and accordingly the production cost of the needle roller bearing 21 is increased. In addition, according to the carbon steel containing less than 0.15 wt % of carbon, a sufficient carburized layer is not provided even by the nitrocarburizig method in some cases, and surface origin type peeling could be generated in the track surface. Meanwhile, according to carbon steel containing more than 1.1 wt % of carbon, since processability is considerably lowered, the processing accuracy is lowered and the production cost is increased due to the increase in the number of processes.

Referring FIG. 16, as a first step, the outline of the outer diameter member 22a is formed by punching a steel plate (a step). In addition, the recession part 22e and the engagement click 22c are also formed at one side end in the longitudinal direction, and the flat part 22f and the projection part 22g are also formed on the other side end. Furthermore, the oil hole 22h may be formed at the same time when the outline is formed.

At this time, the longitudinal length of the outer diameter member 22a is determined based on the diameter of the cam shaft 19 and the lateral length thereof is determined based on the roller length of the used needle roller 23. Here, it is to be noted that since the lateral length contains the flange part 22d, the lateral length in this step is longer than the axial width dimension of the completed outer diameter member 22a.

In this step, all parts may be punched out at one time or the predetermined configuration may be formed by repeating the punching process. In addition, when a progressive press is used, it is preferable that a pilot hole 25 is formed in order to determine the process position of each process step and a connection part 26 is provided between the adjacent outer diameter members.

As a second step, the engagement click 22c is formed by bending the circumferential end of the outer diameter member 22a to the radial outer side through a bending process (b step). The bending angle of the engagement click 22c is determined by the shape of the engagement groove 13c of the housing. In addition, according to this embodiment, the engagement click 22c is bent so as to form an angle of 90° with respect to the outer diameter member 22a.

A third step includes a step of bending the outline of the outer diameter member 22a to have the predetermined curvature through a bending process, and a step of forming the flange part 22d so as to project from axial both ends of the outer diameter member 22a to the radial inner side (c step to g step). More specifically, the outline is bent from the longitudinal both ends gradually except for the center part containing the connection part 26 (c step and d step). Then, lateral both ends of the part bent from longitudinal both ends are bent, whereby the flange part 22d is formed (e step). Then, the longitudinal center part is bent so that the outline of the outer diameter member 22a has the predetermined curvature (f step). Finally, the connection part 26 is removed and the flange part 22d is formed at the longitudinal center part (g step).

After the above pressing process, a heat treatment is performed in order to obtain predetermined mechanical properties such as hardness required for the outer diameter member 22a. In addition, the surface hardness Hv of the inner diameter surface of the outer diameter member 22a serving as the track ring needs to be 635 or more.

It is necessary to select an appropriate heat treatment based on the carbon content of the starting material so that the outer diameter member 22a can have a sufficiently deep hardened layer. More specifically, when the material contains 0.15 wt % to 0.5 wt % of carbon, a carburization quenching process is to be performed, and when the material contains 0.5 wt % to 1.1 wt % of carbon, a bright quenching or a high-frequency quenching process is to be performed.

The carburization quenching process is a heat treatment using a phenomenon in which carbon is soluble in high-temperature steel, by which a surface layer has a high carbon content (carburized layer) while the inside of the steel has a low carbon content. Thus, a high-toughness property in which the surface is hard while the inside is soft can be provided. In addition, the plant cost in this process is inexpensive as compared with that of the nitrocarburizing process.

The bright quenching process is a quenching process in which steel is heated in a protective atmosphere or vacuum to prevent a steel surface from being oxidized. In addition, its plant cost is inexpensive as compared with those of the nitrocarburizing process and carburization quenching process.

According to the high-frequency quenching process, a quenched hardened layer is formed by rapidly heating and cooling a steel surface using the principle of induction heating. The plant cost of this process is considerably low as compared with those of the other processes, and this process is environmental-friendly because gas is not used in the heat treatment process. In addition, it has the advantage in that partial quenching process can be performed.

In addition, it is preferable that a tempering process is performed after the above quenching process to reduce the residual stress and internal distortion due to the quenching and to improve the toughness and stabilize the dimension.

In addition, a load is applied to the engagement click 22c in the housing in the rotation direction of the needle roller bearing 21. In order to prevent the engagement click 22c from being damaged due to this load, it is effective to enhance the toughness by lowering the hardness of the engagement click 22c as compared with the other part.

In addition, the hardness Hv of the engagement click 22c is preferably within a range of 300 to 600. When the hardness Hv is more than 600, the engagement click 22c could be damaged by a sudden load. Meanwhile, when the hardness Hv is less than 300, the engagement click 22c could abrade away in an early stage.

According to a specific method to enhance the toughness of the engagement click 22c, only the engagement click 22c is partially annealed after the above heat treatment, or anti-carburizing process is performed only on the engagement click 22c before the above heat treatment. In addition, although the partial annealing or anti-carburizing process may be performed on the whole engagement click 22c, the process is effective by performing only the root part of the engagement click 22c.

The annealing process is performed in order to enhance the toughness by softening the material hardened by the quenching process and it is performed such that the material is gradually cooled after it is heated to the predetermined temperature. In addition, in order to prevent the annealing effect from reaching the track surface of the outer diameter member 22a, a high-frequency annealing is suitable.

The anti-carburizing process is performed to prevent carbon from dissolving due to the carburization quenching process, through which a film is formed on the engagement click 22c. Thus, even when the carburization quenching process is performed, a carburized layer is not likely to be formed in the engagement click 22c on which the film is formed.

In addition, although the step of forming the curvature of the outline of the outer diameter member 22a and the step of forming the flange part 22d are performed in parallel in this embodiment, the step of forming the curvature of the outline and the step of forming the flange part 22b may be separately performed.

In addition, the first to third steps are only one example of the production method of the outer diameter member according to the present invention, and each step may be further divided or a necessary step may be added thereto. In addition, the order of the processes can be optionally changed.

Furthermore, although the steps (a step to g step) may be performed individually by a single press, they may be performed by the progressive press or transfer press. Thus, the steps can be sequentially performed. In addition, when a production equipment of the outer diameter member 22a having a processing part corresponding to the all or one part of the steps (a step to g step) is used, the productivity can be enhanced and accordingly, the production cost of the needle roller bearing 21 can be lowered.

In addition, the term "progressive press" in this specification designates a method in which the material is sequentially processed from step to step while it is moved by a feeder at an press inlet in a press containing the plurality of processing steps. In addition, the term "transfer press" in this specification designates a method in which when the plurality of process steps are required, stages required for the steps are provided and the material is moved by a transfer device and processed from stage to stage.

Figure 17:
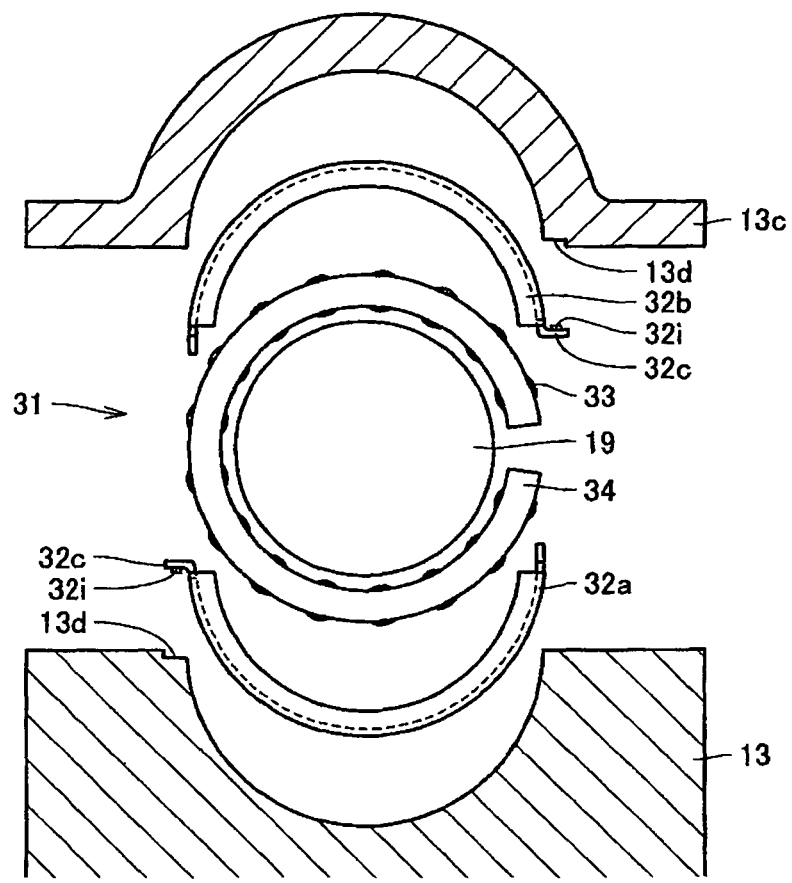
FIG. 17 is a view showing a state before a cam shaft support structure according to another embodiment of the present invention is incorporated.
Figure 18:
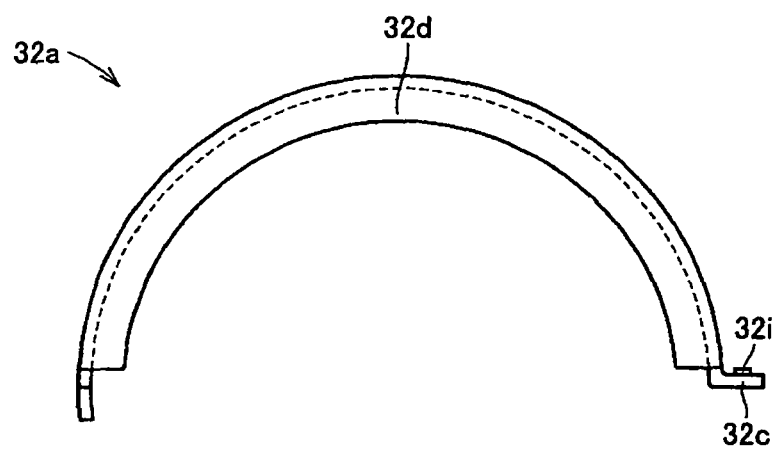
FIG. 18 is a view showing an outer ring member of a roller bearing shown in FIG. 17.
Figure 19:
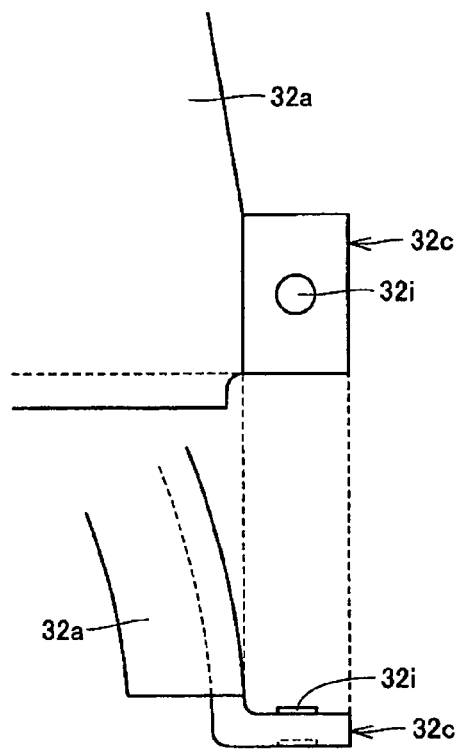
FIG. 19 is an enlarged view showing an engagement click of the outer ring member shown in FIG. 18.
Figure 20:
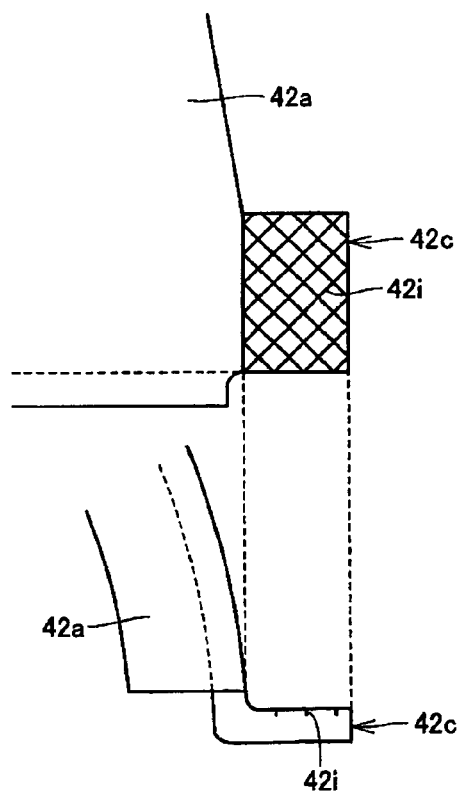
FIG. 20 is a view showing another embodiment of the engagement click shown in FIG. 19.
Figure 21:
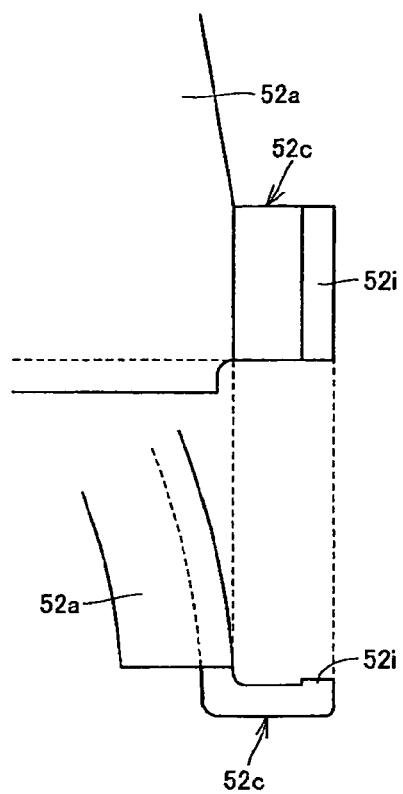
FIG. 21 is a view showing still another embodiment of the engagement click shown in FIG. 19.

Next, a needle roller bearing 31 as a roller bearing according to another embodiment of the present invention and its variation will be described with reference to FIGS. 17 to 21. In addition, FIG. 17 is a view showing a state when the needle roller bearing 31 is incorporated in the cam shaft 19, FIG. 18 is a view showing an outer diameter member 32a in the needle roller bearing 31, and FIGS. 19 to 21 are enlarged views showing an engagement click 32c of the outer diameter member 32a. In addition, since the basic constitution of the needle roller bearing 31 is the same as the needle roller bearing 21, the description of the same part is omitted and different point will be mainly described.

First, referring to FIG. 17, the needle roller bearing 31 comprises an outer ring 32 formed by connecting the arc-shaped outer diameter members 32a and 32b in a circumferential direction, needle rollers 33 arranged along the inner diameter surface of the outer ring 32, a retainer 34 having a split line extending in the axial direction of the bearing at one part of the circumference, and retaining the intervals of the needle rollers 33, and it supports the cam shaft 19 rotatably with respect to the housing 13.

Referring to FIG. 18, the outer diameter member 32a has a semicircular shape having a center angle of 180°, and it has the engagement click 32c bent from one circumferential side end to the radial outer side so as to engage with the cylinder head 13, and a flange part 32d projecting from axial both ends to the radial inner side to regulate the axial movement of the retainer 34.

In addition, referring to FIG. 19, the wall surface of the engagement click 32c continued to the outer diameter surface of the outer diameter member 32a comprises a plurality of parts having relatively different heights. According to this embodiment, a projection part 32i is formed in the center of the engagement click 32c, and the height of the projection part 32i is relatively higher than the other part. This projection part 32i is formed by lifting the center of the engagement click 32c from the back surface (the wall surface of the engagement click 32c continued to the inner diameter surface of the outer diameter member 32a) of the engagement click 32c. Since the projection part 32i functions to enhance the adhesiveness between the housing and the engagement click 32*c*, the outer diameter member 32*a* can be surely positioned with respect to the housing.

Furthermore, referring to FIGS. 20 and 21, another embodiment of the outer diameter member having the engagement click will be described. In addition, since the basic constitution is the same as that of the outer diameter member 22*a* shown in FIGS. 2 to 10, a difference point will be described mainly.

First, referring to FIG. 20, a plurality of knurling grooves 42*i* are formed on the wall surface of an engagement click 42*c* continued to the outer diameter surface of an outer diameter member 42*a*, and the part of the knurling groove 42*i* is relatively lower than the other part. The knurling groove 42*i* is formed by a cutting process or a coining process.

Next, referring to FIG. 21, the tip end of an engagement click 52*c* is bent by 90° to form a bend part 52*i*, and the bend part 52*i* is relatively higher than the wall surface of the engagement click 52*c* continued to the outer diameter surface of an outer diameter member 52*a*. The bend part 52*i* can be formed by swaging the tip end of the engagement click 52*c* instead of by bending.

In addition, although the projection part 32*i* is provided only on the wall surface of the engagement click 32*c* continued to the outer diameter surface of the outer diameter member 32*a* in the embodiment shown in FIG. 19, it may be provided on the wall surface of the engagement click 32*a* continued to the inner diameter surface of the outer diameter member 32*a* or may be provided on both surfaces. The same is true on the knurling groove 42*i* and the bend part 52*i* shown in FIGS. 20 and 12, respectively.

In addition, the projection part 32*i* shown in FIG. 19 may be provided at a plurality of positions instead of one position. The knurling groove 42*i* shown in FIG. 20 can be formed so as to have any width and depth, and the distance between the adjacent knurling grooves 42*i* can be optionally set. The bend part 52*i* shown in FIG. 21 can be formed at any angle with respect to the wall surface and it may be bend at 180°.

In addition, when the above needle roller bearing 31 is incorporated in the cam shaft 19, the space between the engagement groove 13*d* of the cylinder head 13 and the abutment surface of the bearing cap 13*c*, and the space between the engagement groove 13*d* of the bearing cap 13*c* and the abutment surface of the cylinder head 13 are set without considering the projection part 32*i*. Therefore, the wall surfaces of the projection part 32*i* and the engagement groove 13*d* abutting on the projection part 32*i* are stuck fast while deformed.

As a result, the adhesiveness between the cylinder head 13 and the abutment surface of the bearing cap 13*c* is enforced. Thus, even when high rotation torque is generated in the needle roller bearing 31, the outer diameter members 32*a* and 32*b* are surely positioned with respect to the housing.

In addition, according to the engagement click 52*c* having the bend part 52*i* shown in FIG. 21, the adhesiveness between the housing and the engagement click 52*c* can be enhanced for the same reason as the above. In addition, according to the engagement click 42*c* having the knurling groove 42*i* shown in FIG. 20, since the friction between the engagement click 42*c* and the housing is increased, the adhesiveness between them is enhanced.

Figure 22:
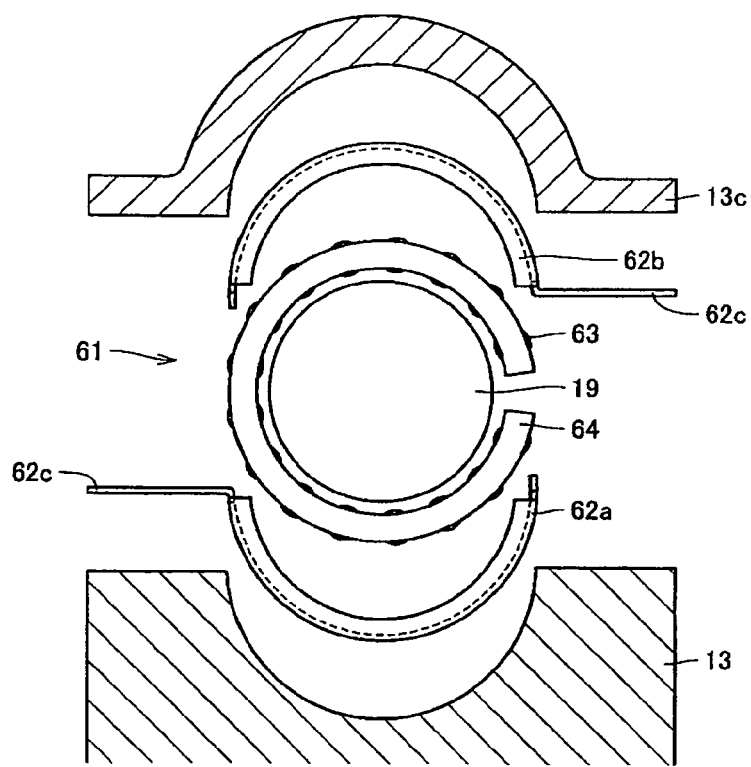
FIG. 22 is a view showing a state before a cam shaft support structure according to still another embodiment of the present invention is incorporated.
Figure 23:
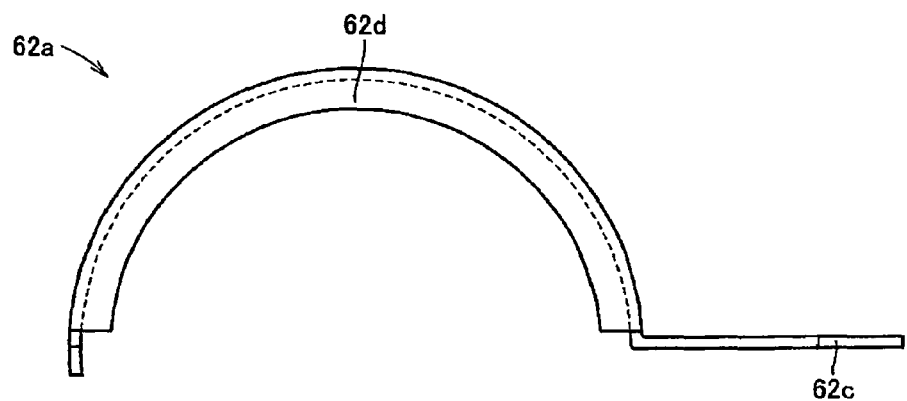
FIG. 23 is a view showing an outer ring member of a roller bearing shown in FIG. 22.
Figure 24:
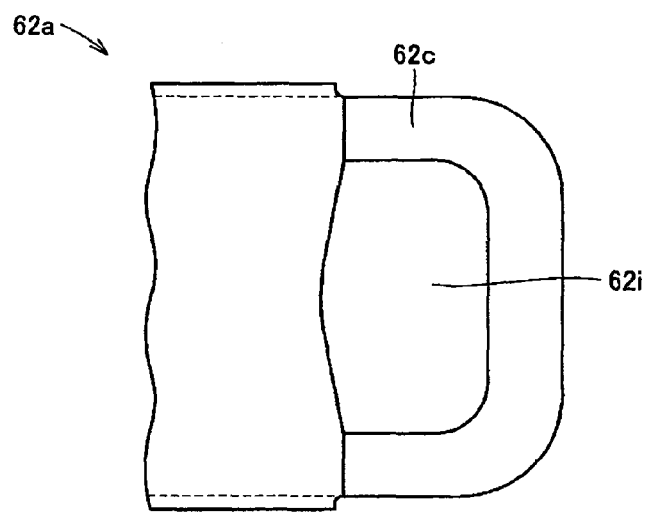
FIG. 24 is an enlarged view showing an engagement click of the outer ring member shown in FIG. 23.
Figure 25:
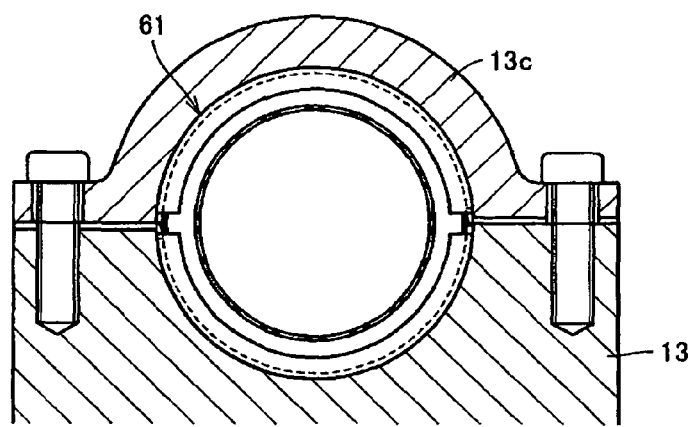
FIG. 25 is a sectional view showing a state after the cam shaft support structure shown in FIG. 22 is incorporated, taken from the axial direction.
Figure 26:
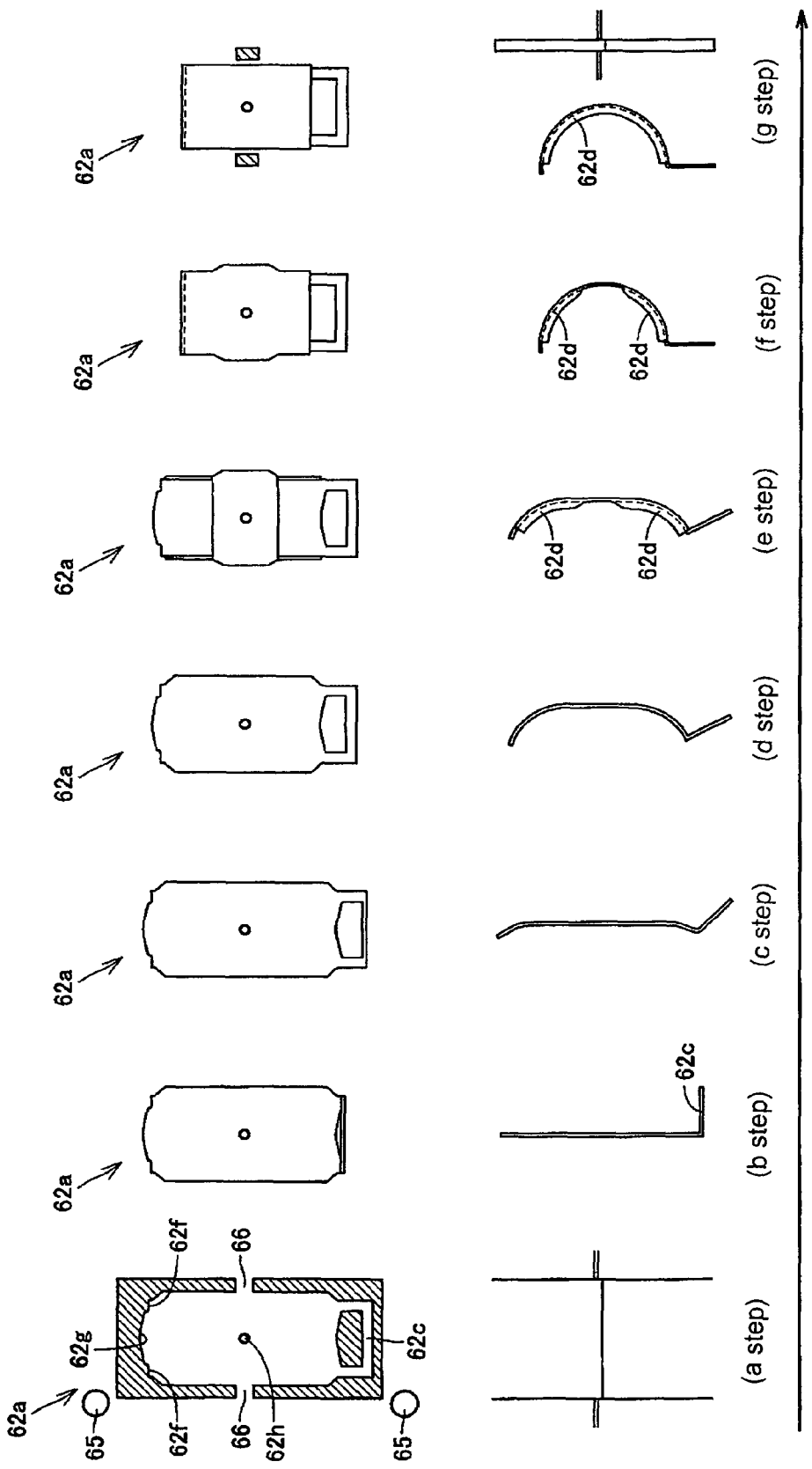
FIG. 26 is a view showing one part of a production process of the outer ring member shown in FIG. 23, in which an upper part is a plan view and a lower part is a sectional view.

Next, a needle roller bearing 61 according to still another embodiment of the present invention will be described with reference to FIGS. 22 to 26. In addition, FIGS. 22 and 25 are views showing states before and after the needle roller bearing 61 is incorporated in the cam shaft 19, and FIG. 23 is a view showing an outer diameter member 62*a* in the needle roller bearing 61, FIG. 24 is an enlarged view showing an engagement click 62*c* of the outer diameter member 62*a*, and FIG. 26 is a view showing a part of the production method of the outer diameter member 62*a*. In addition, since the basic constitution of the needle roller bearing 61 is the same as that of the needle roller bearing 21, the description of the same part will not be reiterated and a different point will be described mainly.

First, referring to FIG. 22, the needle roller bearing 61 comprises an outer ring 62 formed by connecting the plurality of arc-shaped outer diameter members 62*a* and 62*b* in the circumferential direction, a plurality of needle rollers 63 arranged along the inner diameter surface of the outer ring 62, and a retainer 64 having a split line extending in the axial direction of the bearing at one part of the circumference, and retaining the intervals of the needle rollers 63, and it supports the cam shaft 19 rotatably with respect to the housing 13.

Referring to FIG. 23, the outer diameter member 62*a* has a semicircular shape having a center angle of 180°, and it has an engagement click 62*c* bent from one circumferential side end to the radial outer side so as to engage with the cylinder head 13, and a flange part 62*d* projecting from axial both ends to the radial inner side to regulate the axial movement of the retainer 64.

Then, referring to FIG. 24, the two engagement click 62*c* project from the circumferential end of the outer diameter member 62*a* and connected at the position apart from the circumferential end. More specifically, the opening of the roughly U-shaped engagement click 62*c* is provided toward the circumferential end of the outer diameter member 62*a*. In addition, the region surrounded by the circumferential end of the outer diameter member 62*a* and the roughly U-shaped engagement click 62*c* functions as a bolt hole 62*i* for a bolt to fix the housing.

The above engagement click 62*c* has the advantage in that the whole engagement click 62*c* can uniformly support the load applied from the housing, and the engagement click 62*c* can be prevented from being deformed by the load, as compared with the engagement click provided at the circumferential end independently.

In addition, although the engagement click 62*c* has the roughly U shape in the embodiment shown in FIG. 24, it can have any shape. For example, it may have an arc shape or triangle shape.

Referring to FIG. 25, when the above needle roller bearing 61 is incorporated in the cam shaft 19, the bolt for fixing the cylinder head 13 and the bearing cap 13*c* is inserted into the bolt hole 62*i* of the engagement click 62*c*. In addition, as shown in FIG. 25, when the radial length of the engagement click 62*c* is equal to the length of the abutment part of the cylinder head 13 and the bearing cap 13*c*, since it is not necessary to provide the engagement groove for receiving the engagement click 22*c* at the abutment part of both members 13 and 13*c*, the number of production steps can be reduced.

Here, the abutment surface of the cylinder head 13 and the bearing cap 13*c* is parallel to the axial direction of the cam shaft, that is, the rotation axis of the bearing in general. Thus, when the two engagement click 62*c* provided at the circumferential end of each of the outer diameter members 62*a* and 62*b* are arranged so as to be linearly parallel to the rotation axis of the needle roller bearing 61, the engagement click 62*c* can engage with the space between the cylinder head 13 and the bearing cap 13*c*.

Next, referring to FIG. 26, when the outer diameter member 62*a* is produced, the engagement click 62*c* containing the bolt hole 62*i* is formed through a punching process (a step).

Since a starting material and the following production steps are the same as those shown in FIG. 16, a detail description thereof will not be reiterated.

Next, referring to FIGS. 27 and 28, needle roller bearings 71 and 81 in which the retention property of lubricant oil is improved will be described. Since the basic, constitution thereof is the same as the needle roller bearing 21, a different point will be described mainly.

Figure 27:
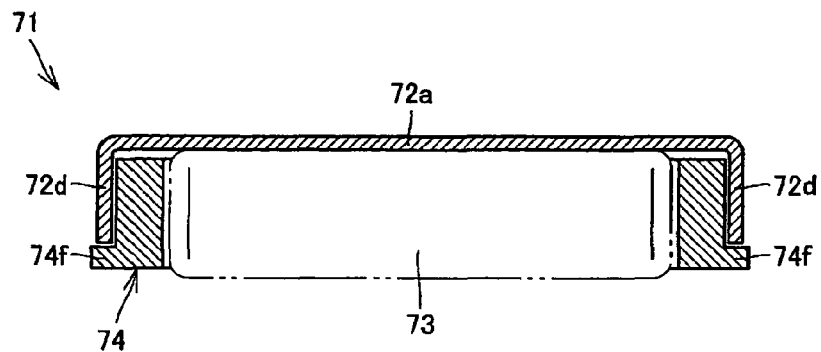
FIG. 27 is a view showing a retainer according to another embodiment of the present invention and showing the retainer having expansion parts at axial both ends.

Referring to FIG. 27, the needle roller bearing 71 according to still another embodiment of the present invention comprises an outer diameter member 72a forming an outer ring, a plurality of needle roller 73 arranged along the inner diameter surface of the outer ring, and a retainer 74 retaining the interval of the adjacent needle rollers 73.

The retainer 74 has an axial end face opposed to an axial inner-side wall surface of a flange part 72d of the outer diameter member 72a, and an expansion part 74f extending from the axial end face on each of right and left sides to a most inner diameter part of the flange part 72d. The expansion part 74f is formed over the whole circumference of the retainer 74.

When the retainer 74 having the above constitution is used, the lubricant oil supplied from an oil hole 72h of the outer diameter member 72a and discharged from the axial end of the needle roller bearing 71 needs to pass through the space between the axial inner-side wall surface of the flange part 72d of the outer diameter member 72a and the axial end face of the retainer 74, and the space between the most inner diameter part of the flange part 72d and the expansion part 74f. Thus, since an oil path from the inside of the bearing to the axial outer side becomes long due to the expansion part 74f, the lubricant oil retention property of the needle roller bearing 71 can be improved.

Figure 28:
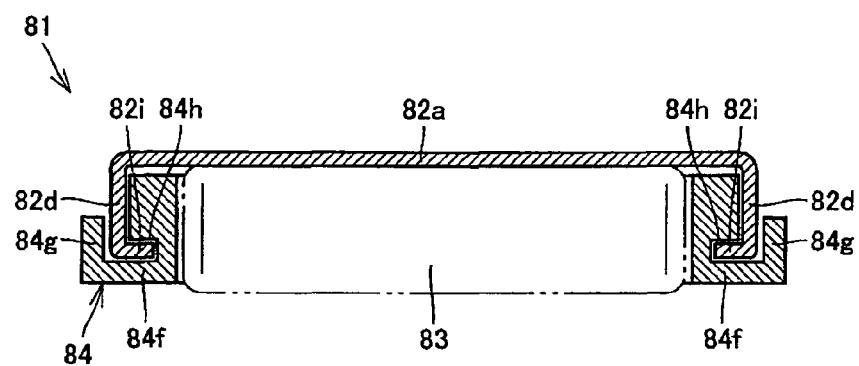
FIG. 28 is a view showing a retainer according to another embodiment of the present invention and showing the retainer having expansion parts and projection parts at axial both ends.

Referring to FIG. 28, the needle roller bearing 81 according to still another embodiment comprises an outer diameter member 82a forming an outer ring, a plurality of needle rollers 83 arranged along the inner diameter surface of the outer ring 82, and a retainer 84 retaining the interval of the adjacent needle rollers 83.

The outer diameter member 82a has a flange part 82d projecting from axial both to the radial inner side, and a bend part 82i bending from the most inner diameter part of the flange part 82d to the axial inner side. According to this embodiment, the bend part 82i is bent at an angle of 90° with respect to the flange part 82d.

The retainer 84 has an axial end face opposed to the axial inner-side wall surface of the flange part 82d of the outer diameter member 82a, an expansion part 84f extending from the axial end face on each of right and left sides to the axial outer side until a position opposed to the most inner diameter part of the flange part 82d, a projection part 84g projecting from the tip end of the expansion part 84f to the radial outer side so as to be opposed to the axial outer-side wall surface of the flange part 84d, and a recession part 84h recessed from the axial end face and receiving the bend part 82i.

According to the above constitution, since an oil path from the inside of the bearing to the axial outer side becomes longer than that of the retainer 74 shown in FIG. 27, the lubricant oil retention property of the needle roller bearing 81 can be improved.

In addition, when the outer diameter member 82a is mounted on the retainer 84 from the radial outer side, the bend part 82i is fit in the recession part 84h of the retainer 84 by elastically deforming the outer diameter member 82a. Therefore, the dimensions of the bend part 82i and the recession part 84h have to be determined within a range of the elastic deformability of the outer diameter member 82a. Similarly, since the retainer 84 having the recession part 84h recessed from the axial end face to the axial inner side needs to be removed (force removal) at the time of injection molding using the elastic deformation of the resin material, the dimension of the recession part 84h has to be determined within a range of the elastic deformability of the retainer 84.

In addition, although the bend part 82i is bent at 90° with respect to the flange part 82d in this embodiment, the present invention is not limited to this and the dimension of the bend part 82i can be increased when the angle between the flange part 82d and the bend part 82i is a blunt angle. Similarly, when the recession part 84h of the retainer 84 is formed so as to be opened toward the radial outer side, the recessed amount of the recession part 84h can be increased.

In addition, although it is preferable that the space between the bend part 82i and the recession part 84h is small in view of the retention property of the lubricant oil, the space has to have a certain distance in order to maintain the smooth rotation of the needle roller bearing 81. Furthermore, although the lubricant oil retention property can be improved as the projection amount of the projection part 84g of the retainer 84 is increased, the tip end of the projection part 84g has to be positioned on the inner side from the outer diameter surface of the outer diameter member 82a so as not to hinder the rotation of the needle roller bearing 81.

Figure 29:
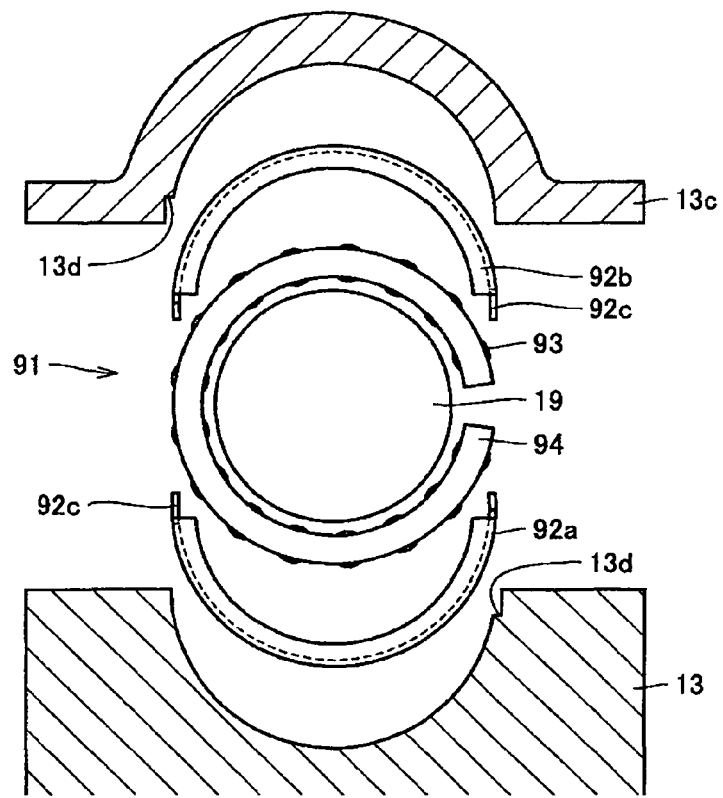
FIG. 29 is a view showing a state before a cam shaft support structure according to another embodiment of the present invention is incorporated.
Figure 30:
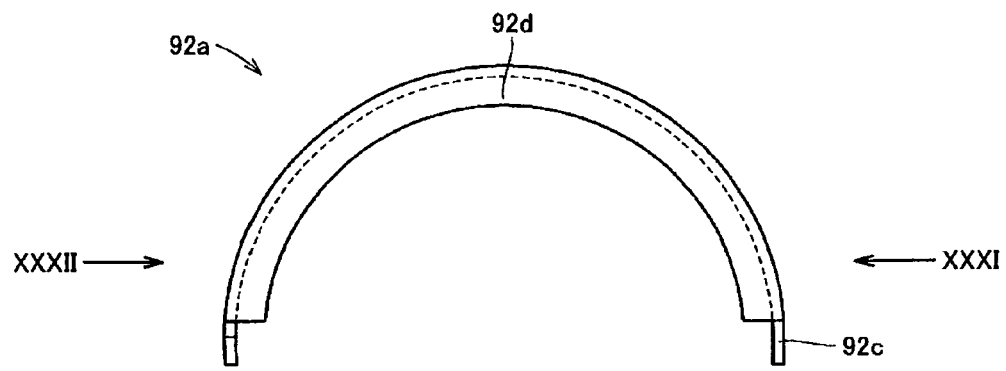
FIG. 30 is a view showing an outer ring member of a roller bearing shown in FIG. 29.
Figure 31:
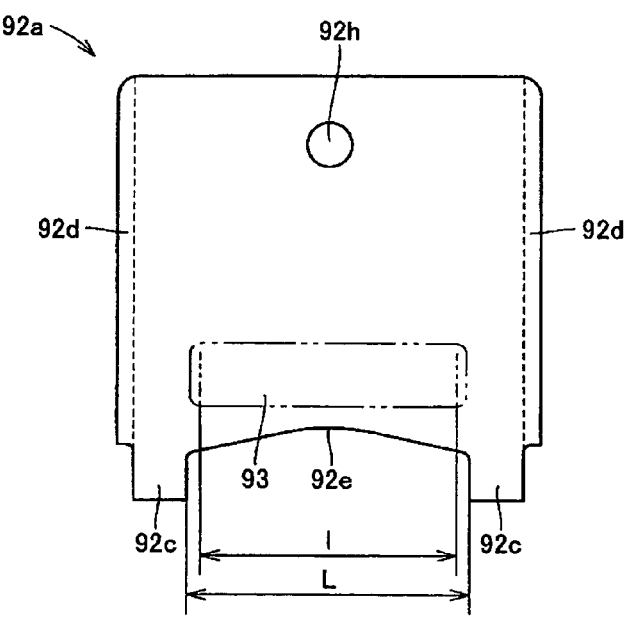
FIG. 31 is a view taken from XXXI direction in FIG. 30.
Figure 32:
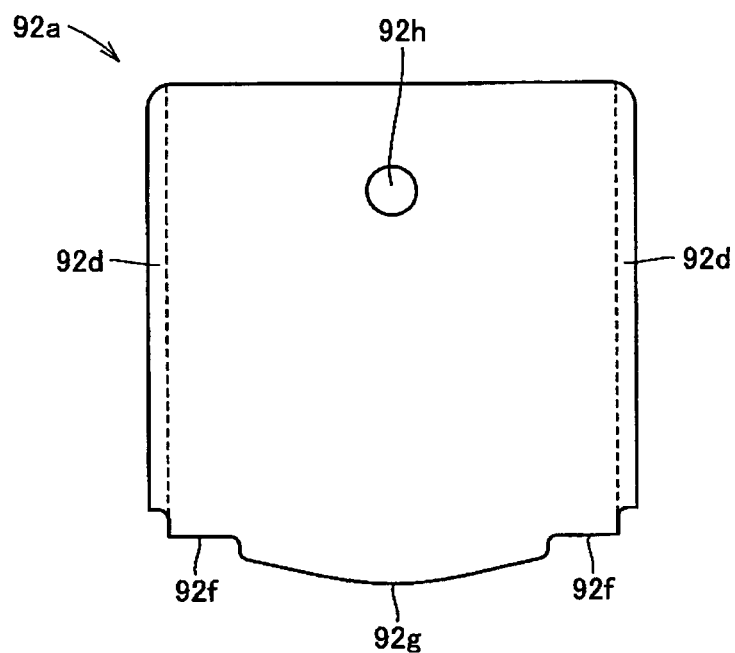
FIG. 32 is a view taken from XXXII direction in FIG. 30.
Figure 33:
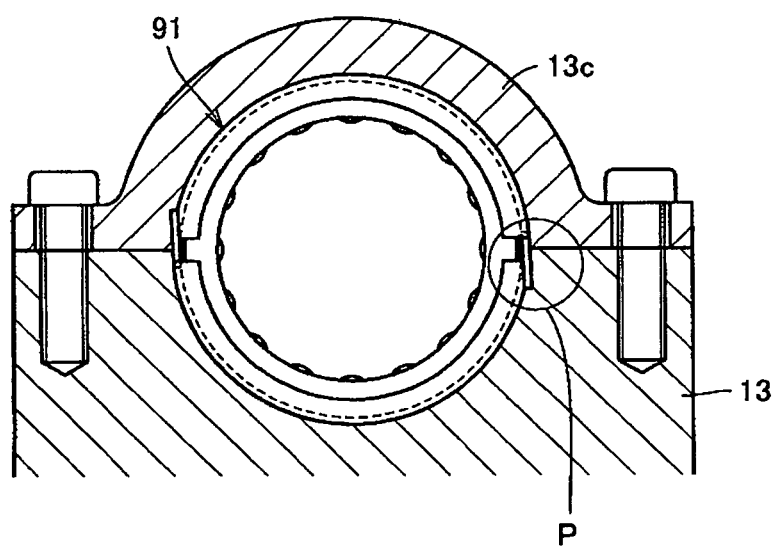
FIG. 33 is a sectional view showing a state after the cam shaft support structure shown in FIG. 29 is incorporated, taken from the axial direction.
Figure 34:
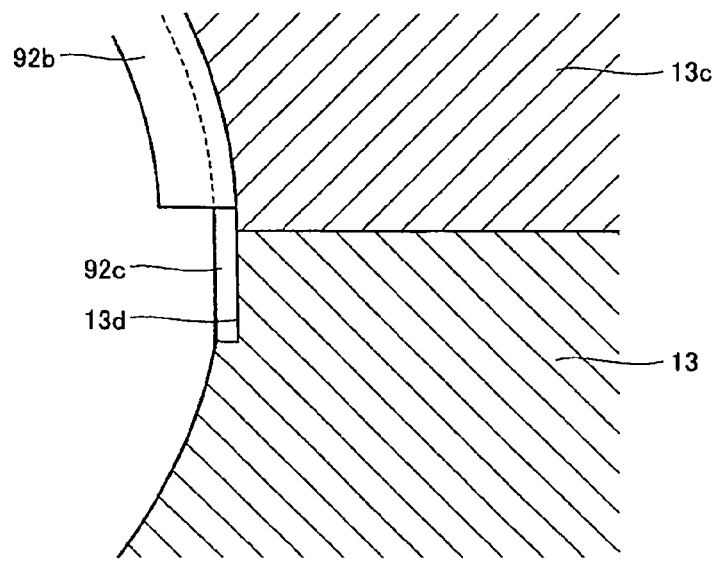
FIG. 34 is an enlarged view showing a part P in FIG. 33.

Although the engagement click 22c is bent to the radial outer side as the engagement member of the outer diameter members 22a and 22b in the above embodiment, the present invention is not limited to this and various kinds of configurations that can engage with the housing and prevent the rotation of the outer diameter member may be employed. For example, a needle roller bearing 91 according to still another embodiment of the present invention will be described with reference to FIGS. 29 to 34. In addition, FIGS. 29, 33 and 34 show the states before and after a cam shaft support structure according to still another embodiment of the present invention is incorporated, FIGS. 30 to 32 are views showing an outer diameter member 92a according to still another embodiment of the present invention. In addition, since the basic constitution of the needle roller bearing 91 is the same as that of the needle roller bearing 21, a description thereof will not be reiterated and a different point will be described mainly.

First, referring to FIG. 29, the needle roller bearing 91 comprises an outer ring 92 formed by connecting the plurality of arc-shaped outer diameter members 92a and 92b in a circumferential direction, a plurality of needle rollers 93 arranged along the inner diameter surface of the outer ring 92, and a retainer 94 having a split line extending in the axial direction of the bearing at one part of the circumference, and retaining the intervals of the needle rollers 93, and it supports the cam shaft 19 rotatably with respect to the housing 13.

The outer diameter member 92a has a semicircular shape having a center angle of 180°, and it has an engagement click 92c provided at one circumferential side end to engage with the cylinder head 13, and a flange part 92d projecting from axial both ends to the radial inner side to regulate the axial movement of the retainer 94. In addition, since the outer ring member 92b has the same constitution, its description will not be reiterated.

The engagement click 92c tangentially projects from one circumferential side end of the outer ring member 92a. In addition, the engagement click 92c is arranged at a position apart from an axial center of the outer ring member 92a serving as the track surface of the needle roller 93s, that is, it is provided at an axial each end of the outer ring member 92a.

Furthermore, referring to FIGS. 33 and 34, when the needle roller bearing 91 having the above constitution is incorporated in the cam shaft 19, the engagement click 92c of the outer ring member 92a engages with an engagement groove 13d of the housing 13 such that it overhangs the outer diameter surface of the other circumferential side end of the adjacent outer ring member 92b. The same is true on the engagement click 92c of the outer ring member 92b.

In addition, since the constitution of the retainer 94 is the same as the retainer 24 shown in FIGS. 11 and 12, its description will not be reiterated.

According to the above constitution, the outer ring members 92a and 92b are prevented from rotating in the housings 13 and 13a. Furthermore, since it is not necessary to bend the engagement clicks 92c at the circumferential ends of the outer ring members 92a and 92b, the outer ring members 92a and 92b serving as the track surface of the needle roller 93 are not deformed when the engagement clicks 92c are formed. As a result, the needle rollers 93 can rotate smoothly in the needle roller bearing 91.

Figure 36:
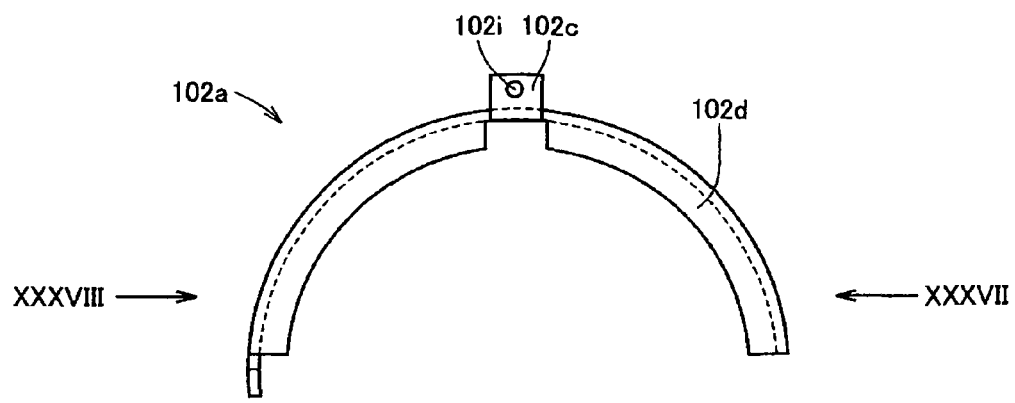
FIG. 36 is a view showing an outer ring member of a roller bearing shown in FIG. 35.
Figure 37:
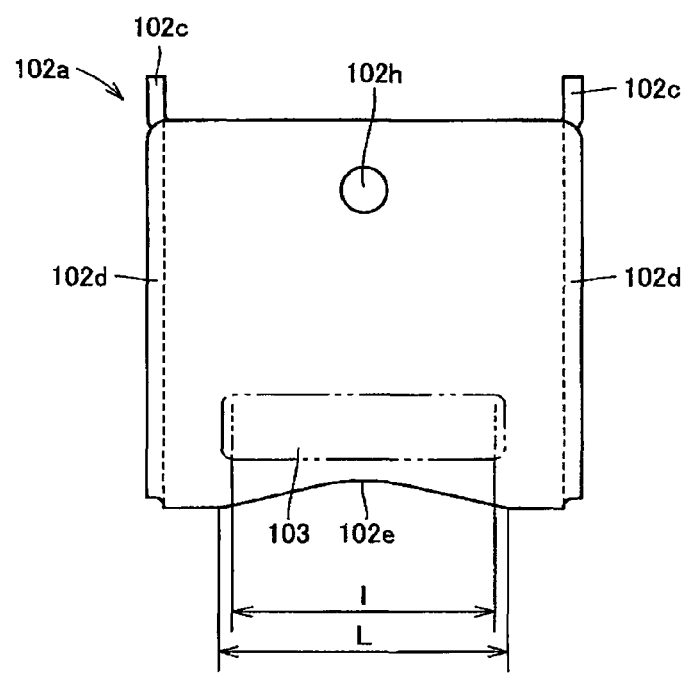
FIG. 37 is a view taken from XXXVII direction in FIG. 36.
Figure 38:
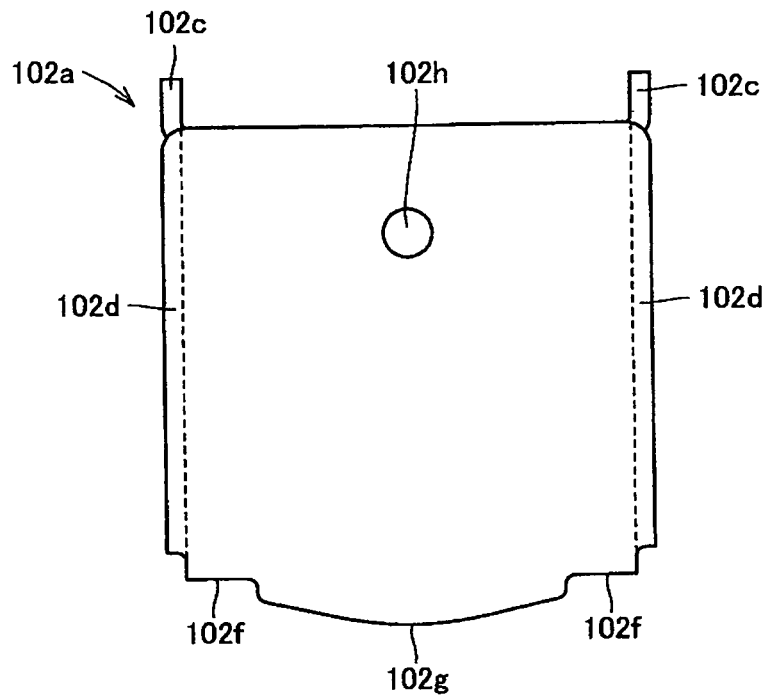
FIG. 38 is a view taken from XXXVIII direction in FIG. 36.
Figure 39:
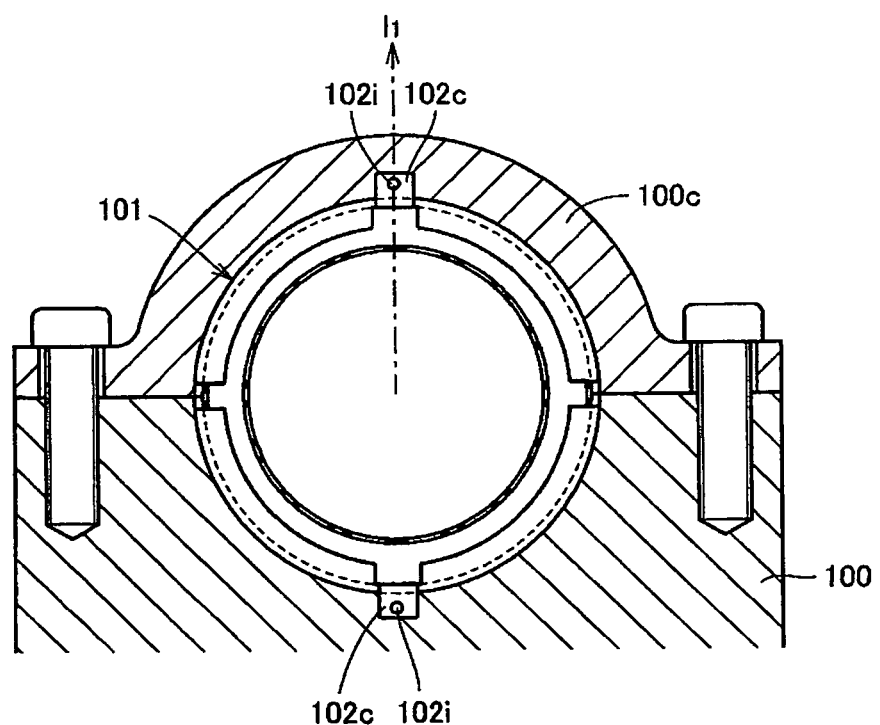
FIG. 39 is a sectional view showing a state after the cam shaft support structure shown in FIG. 29 is incorporated, taken from the axial direction.
Figure 40:
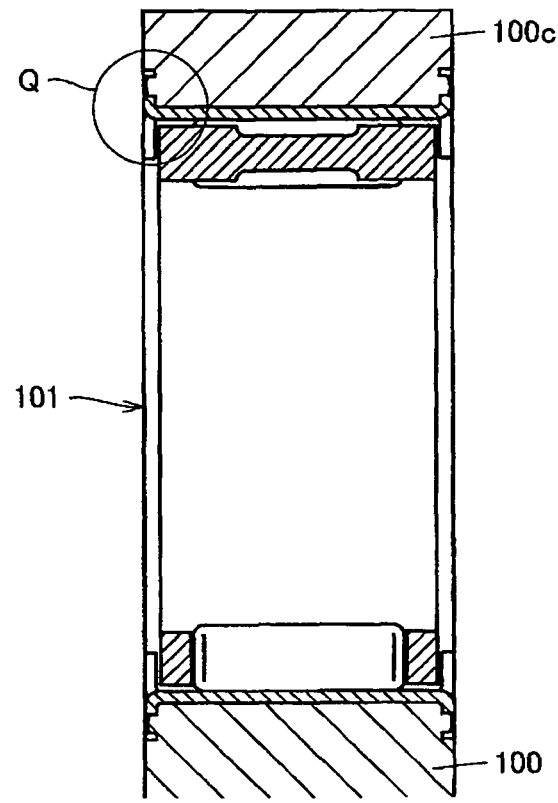
FIG. 40 is a sectional view showing a state after the cam shaft support structure shown in FIG. 29 is incorporated, taken from the radial direction.

A needle roller bearing 101 and a cam shaft support structure using the needle roller bearing 101 according to still another embodiment of the present invention will be described with reference to FIGS. 35 to 41. In addition, since the basic constitution of the needle roller bearing 101 is the same as the needle roller bearing 21, a description of the same part will not be reiterated and a different point will be described mainly. In addition, FIGS. 35 and 39 to 41 are views showing the state before and after the cam shaft support structure is incorporated, and FIGS. 36 to 38 are views showing each component of the needle roller bearing 101.

Figure 35:
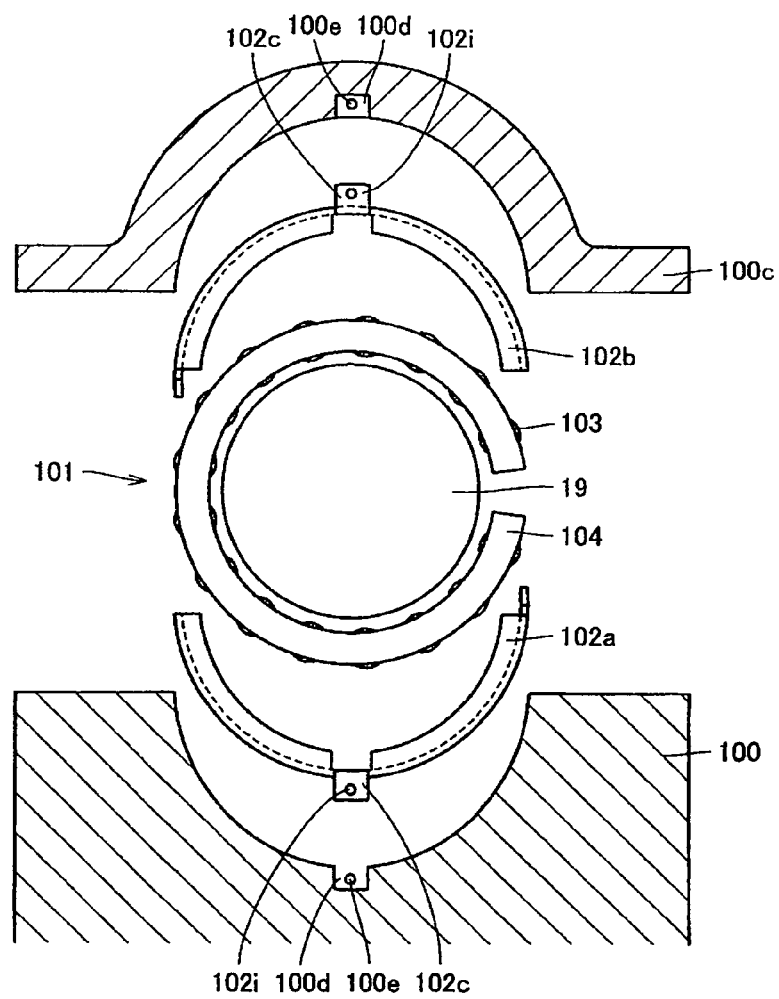
FIG. 35 is a view showing a state before a cam shaft support structure according to another embodiment of the present invention is incorporated.

First, referring to FIG. 35, the cam shaft support structure comprises the cam shaft 19, a cylinder head 100 and a bearing cap 100c to house the cam shaft 19, and the needle roller bearing 101 supporting the cam shaft 19 rotatably with respect to the housing.

The needle roller bearing 101 comprises an outer ring 102 formed by connecting a plurality of arc-shaped outer ring members 102a and 102b in a circumferential direction, a plurality of needle rollers 103 arranged along the inner diameter surface of the outer ring 102, and a retainer 104 having a split line extending in the axial direction of the bearing at one part of the circumference, and retaining the intervals of the needle rollers 103.

The outer ring member 102a will be described with reference to FIGS. 36 to 38. In addition, FIG. 36 is a side view showing the outer ring member 102a, FIG. 37 is a view taken from XXXVII direction in FIG. 36, and FIG. 38 is a view taken from XXXVIII direction in FIG. 36. In addition, since the outer ring member 102b has the same configuration as the outer ring member 102a, its description will not be reiterated.

First, referring to FIG. 36, the outer ring member 102a has a semicircular configuration having a center angle of 180°, and it has engagement clicks 102c at axial both ends and a flange part 102d. Thus, the two outer ring members 102a and 102b are connected in the circumferential direction to form the annular outer ring 102. In addition, the axial center of the inner diameter surface of the outer ring 102 serves as a track surface of the needle roller 103.

The engagement click 102c projects from axial both ends of the circumferential center to the radial outer side, and engages with the housing when incorporated, to prevent the rotation of the outer ring member 102a. In addition, the axial wall surface of the engagement click 102c is provided with a stopper means 102i to prevent the outer ring member 102a from escaping from the housing.

The flange part 102d projects from the axial end to the radial inner side over almost the whole circumferential region of the outer ring member 102a except for the part of the engagement click 102c. The flange part 102d regulates the axial movement of the retainer 104 and improves lubricant oil retention property in the bearing. In addition, the engagement click 102c and the flange part 102d are arranged on the same plane perpendicular to the rotation axis of the needle roller bearing 101. Thus, the outer ring member 102a is prevented from becoming large and the rigidity of the engagement click 102c and the flange part 102d is improved.

In addition, referring to FIG. 37, a roughly V-shaped recession part 102e in which the axial center is recessed in the circumferential direction is formed at one circumferential side end of the outer ring member 102a. In addition, referring to FIG. 38, the other circumferential side end of the outer ring member 102 is provided with two flat parts 102f at axial both ends, and a roughly V-shaped projection part 102g provided between the two flat parts 102f and having an arc-shaped tip end projecting in the circumferential direction. In addition, the recession part 102e receives the projection part 102g of the adjacent outer ring member when the outer ring members 102a and 102b are connected in the circumferential direction. Thus, when the abutment part has the roughly V shape, the needle roller 103 can smoothly rotate. In addition, the shape of the abutment part of the outer ring members 102a and 102b is not limited to the roughly V shape, and it may be any shape as long as the needle roller 103 can smoothly rotate, such as a roughly W shape.

Furthermore, referring to FIGS. 37 and 38, the outer ring member 102a is provided with an oil hole 102h penetrating from the outer diameter side to the inner diameter side. The oil hole 102h is provided at a position opposed to an oil path (not shown) provided in the housing, and lubricant oil is supplied to the bearing 101 through the oil hole 102h. In addition, the size, position and number of the oil hole 102h depend on the size, position and number of the oil path.

In addition, since the constitution of the retainer 104 is the same as that of the retainer 24 shown in FIGS. 11 and 12, its description will not be reiterated.

Next, referring to FIGS. 35 and 39 to 41, a description will be made of the assembling process in which the needle roller bearing 101 is incorporated in the cam shaft 19.

First, the needle roller 103 is incorporated in a pocket 104c of the retainer 104. Then, the split part is enlarged using the elastic property of the retainer 104 to mount the retainer 104 on the cam shaft 19. Then, a recession part 104d engages with a projection part 104e to fix the retainer 104.

Then, the outer ring member 102a is fit in the inner circumferential surface of the cylinder head 100 and the engagement click 102c engages with a recession part 100d of the cylinder head 100. Furthermore, with engaging means 102i and 100e provided in the engagement click 102c and the recession part 100d, respectively, the outer ring member 102a is prevented from escaping from the cylinder head 100. At this time, the oil hole 102h provided in the outer ring member 102a and an oil path (not shown) of the cylinder head 100 are to be opposed. The same operation is performed between the outer ring member 102b and the bearing cap 100c.

Figure 41:
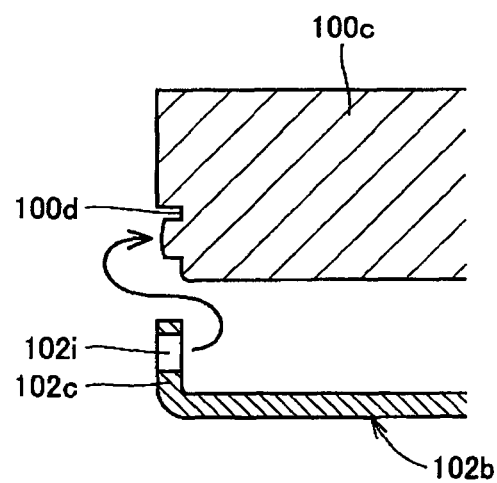
FIG. 41 is an enlarged view showing a part Q in FIG. 40.

Referring to FIG. 41, the specific structures of the engaging means 102i and 100e provided in the outer ring member 102a and the cylinder head 100 will be described. In the recession part 100d of the cylinder head 100 receiving the engagement click 102c, the projection part 100e projecting from the bottom wall is formed. Meanwhile, in the outer ring member 102a, the hole 102i penetrating the axial wall surface of the engagement click 102c is formed. Thus, when the projection 100e is fit in the hole 102i using the elastic property of the engagement click 102c, the outer ring member 102a can be fixed so as not to escape from the bearing cap 100.

Thus, the cam shaft 19 with the retainer 104 is set on the cylinder head 100 with the outer ring member 102a, and the bearing cap 100c with the outer ring member 102b is set thereon, and the cylinder head 100 and the bearing cap 100c are fixed by a bolt and the like.

According to the above incorporating process, the cam shaft 19, the outer ring 102, the retainer 104 and the housing are arranged concentrically, so that the needle roller 103 of the needle roller bearing 101 can stably rotate. In addition, according to the above needle roller bearing 101, since the outer ring 102 is split into the two outer ring members 102a and 102b, and the retainer 104 is split at the circumferential one point, it can be incorporated in the support part in the radial direction, so that it can be employed as the bearing that supports the cam shaft 19.

In addition, since the assembling operation can be performed such that the outer ring members 102a and 102b previously engage with the housing and the retainer 104 is wound around cam shaft 19 and fixed, the bearing component does not fall during the assembling operation. As a result, the assembling operation of the cam shaft support structure can be simplified. In addition, the engagement click 102c having the above constitution can be elastically deformed from the bending part, the projection 100e can be fit in the hole 102i easily.

Furthermore, the outer ring members 102a and 102b are to be incorporated such that the hole 102i is positioned on a phantom line 11 extending in a maximum load direction applied from the cam shaft 19 to the needle roller bearing 101. According to the cam shaft support structure having the above constitution, the degree of adhesion between the outer ring members 102a and 102b and the housings 100 and 100e is highest at the position in which the projection 100e is fit in the hole 102i. Therefore, the cam shaft support structure can support highest load at this position (position of the projection 100e and the hole 102i). Thus, when this position is arranged at a region in which the highest load is applied, the cam shaft support structure can be superior in durability.

In addition, according to the internal combustion engine 11 shown in FIG. 47, the maximum load applied from the cam shaft 19 to the needle roller bearing 101 is the reaction of the force pushing down the valves 17 an 18 against the valve springs 17c and 18c and its direction is opposite to the direction the cam shaft 19 pushes down the valves 17 and 18 (direction shown by arrows in FIG. 47).

In addition, even when the projection 100e and the hole 102i are not positioned strictly on the phantom line $l_1$, the effect of the present invention can be provided. For example, when the engagement click 102c having the hole 102i is positioned on the phantom line $l_1$, the effect of the present invention can be sufficiently provided.

In addition, although the retainer 104 according to the above embodiment is formed of the resin whose production efficiency is high and elastic deformability is high, the present invention is not limited to this, and it may be a machined retainer produced by a cutting process, or it may be a pressed retainer produced by pressing a steel plate.

In addition, although the flange part 102d according to the above embodiment is provided over the whole circumferential region of the outer ring members 102a and 102b except for the part of the engagement click 102c, the present invention is not limited to this, and it may be partially provided at a circumferential part. In this case, although the position and the number of the flange part can be optionally set, it is preferable that it is arranged in the non-load region when incorporated in the cam shaft 19.

In addition, although the projection 13e provided in the housing and the hole 102i provided in the outer ring members 102a and 102b are described as engaging means provided between the outer ring members 102a and 102b and the housing in the above embodiment, the present invention is not limited to this and it can be any constitution to prevent the outer ring members 102a and 102b from escaping from the housing. For example, as a variation of the embodiment shown in FIG. 41, the outer ring member 102b and the cylinder head 100c may be fixed by inserting a bolt into the hole 102i of the engagement click 102c so as to become a projection part, and forming a bolt hole to receive the bolt, in the bottom wall of the recession part 100d of the cylinder head 100c.

Engaging means according to still another embodiment of the present invention will be described with reference to FIGS. 42 and 43. In addition, since its basic constitution is the same as the cam shaft support structure shown in FIGS. 35 to 41, a description is not made of the same part and a different point will be described mainly.

Figure 42:
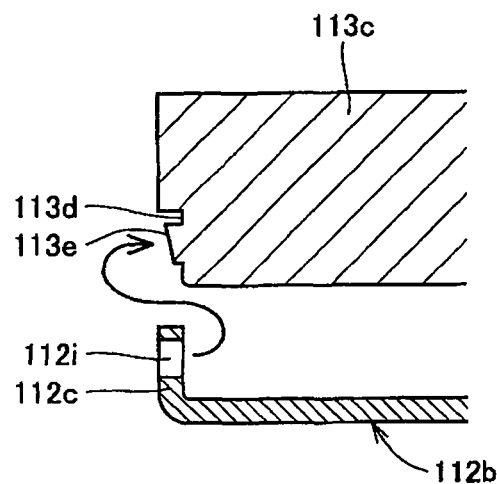
FIG. 42 is a view showing another embodiment of FIG. 41.

First, referring to FIG. 42, a hole 112i as a recession part penetrating the axial wall surface of an engagement click 112c is formed in an outer ring member 112b, and a projection 113e to be fit in the hole 112i is formed on the bottom wall of a recession part 113d of a bearing cap 113c. In addition, the height of the projection 113e is gradually increased toward the inserting direction of the engagement click 112c (upper direction in FIG. 42), so that the engagement click 112c can be easily inserted but it is not likely to escape after the projection 113e is fit in the hole 112i.

Figure 43:
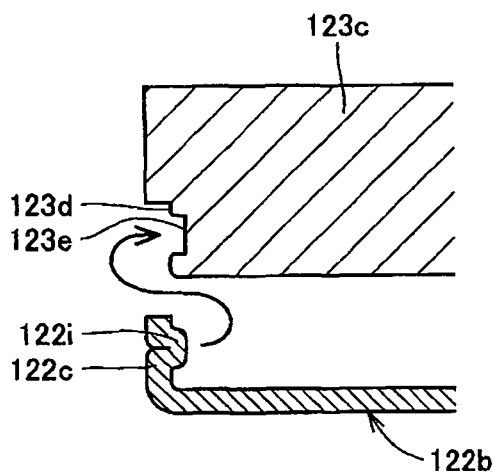
FIG. 43 is a view showing still another embodiment of FIG. 41.

Next, referring to FIG. 43, a projection 122i projecting from an axial wall surface of an engagement click 122c is formed in an outer ring member 122b, and a recession 123e receiving the projection 122i is formed in the bottom wall of a recession part 123d of a bearing cap 123c. When the projection 122i is fit in the recession part 123e, the outer ring member 122b can be prevented from escaping from the bearing cap 123c.

According to the above embodiments shown in FIGS. 41 to 43, the outer ring member can be fixed to the housing by one touch operation by engaging the projection part with the recession part. As a result, the cam shaft support structure and the internal combustion engine can be superior in assembling property.

Although the needle roller bearing 101 is described as the bearing that supports the cam shaft 19 in the above embodiment, the present invention can be applied to other roller bearings such as a cylindrical roller bearing and a rod roller bearing.

In addition, the needle roller bearing 101 according to the above embodiment can be used not only as the bearing for supporting the cam shaft 19 but also as the bearing for supporting the shaft part 15a of the crank shaft 15 shown in FIG. 48 and rocker shaft.

Furthermore, although the present invention can be applied to a single-cylinder internal combustion engine, the present invention can be preferably applied to the bearing that supports the part to which the needle roller bearing 101 cannot be inserted in the axial direction such as the shaft part 15a of the crank shaft 15 employed in the multiple-cylinder engine shown in FIG. 48 and the shaft part 19b of the cam shaft 19 shown in FIG. 49.

Figure 44:
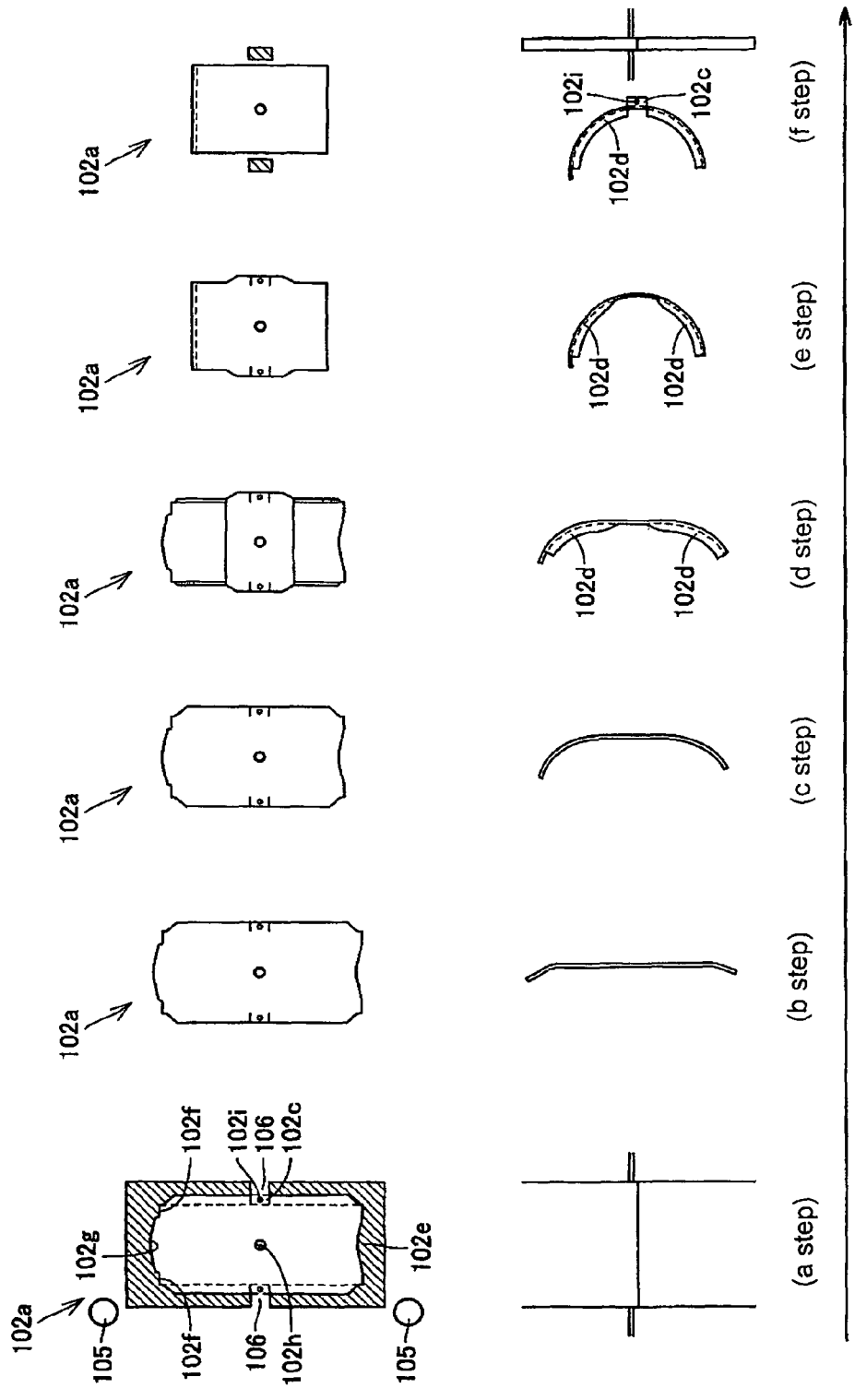
FIG. 44 is a view showing one part of a production process of the outer ring member shown in FIG. 36, in which an upper part is a plan view and a lower part is a sectional view.

Next, the production method of the outer ring member 102a according to one embodiment of the present invention will be described with reference to FIG. 44. In addition, FIG. 44 is views showing a part of the production process of the outer ring member 102a in which an upper part is a plan view and a lower part is a sectional view. In addition, the same part as the manufacturing method of the outer ring member 22a will not be described and a different point will be described mainly. More specifically, since the composition of the starting material and the heat treatment process are the same, their description will not be reiterated. Furthermore, since the manufacturing method of the outer ring member 102b is the same as that of the outer ring member 102a, its description is omitted.

Referring to FIG. 44, the outline of the outer ring member 102a is formed by punching a steel plate as a first step (a step). In addition, the recession 102e is formed at one longitudinal side end, and the flat part 102f and the projection 102g are formed at the other longitudinal side end. Slits between the engagement click 102c and the flange part 102d are formed on lateral both ends, and the hole 102i serving as the stopper means is formed between the two slits. Furthermore, the oil hole 102h may be formed at the same time when the outline is formed.

At this time, the longitudinal length of the outer ring member 102a is determined based on the diameter of the cam shaft 19, and the lateral length thereof is determined based on the length of the used needle roller 103. Here, it is to be noted that since the lateral length contains the parts becoming the engagement click 102c and the flange part 102d, the lateral length in this step is longer than the axial width dimension of the completed outer diameter member 102a.

In this step, all parts may be punched out at one time or the predetermined configuration may be formed by repeating the punching process. In addition, when a progressive press is used, it is preferable that a pilot hole 105 is formed in order to determine the process position of each process step and a connection part 106 is provided between the adjacent outer diameter members. In addition, according to this embodiment, the connection part 106 is provided outside the part to become the engagement click 102c.

A second step includes a step of bending the outline of the outer diameter member 102a through a bending process so as to have a predetermined curvature and a step of forming the flange part 102d so as to project from axial both ends to the radial inner side of the outer ring member 102a (b step to f step). More specifically, the outline is bent from longitudinal both ends gradually except for the center part containing the connection part 106 (b step and c step). Then, lateral both ends of the part bent from longitudinal both ends are bent, whereby the flange part 102d is formed (d step). Then, the longitudinal center part is bent so that the outline of the outer diameter member 102a has the predetermined curvature (e step). Finally, the connection part 106 is removed and the engagement click 102c is bent to the radial outer side (f step).

Figure 45:
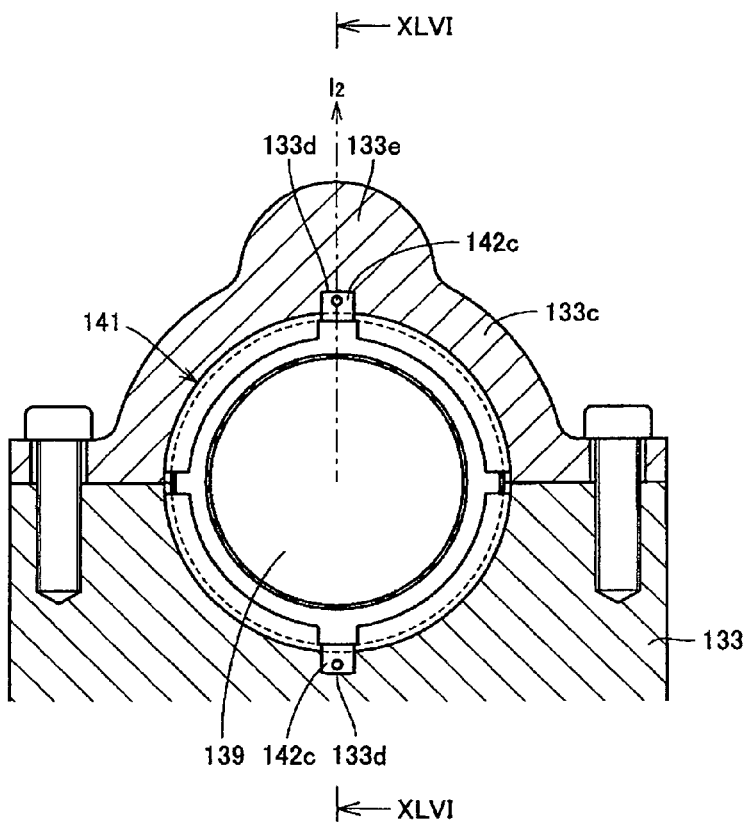
FIG. 45 is a view showing a cam shaft support structure according to another embodiment of the present invention.
Figure 46:
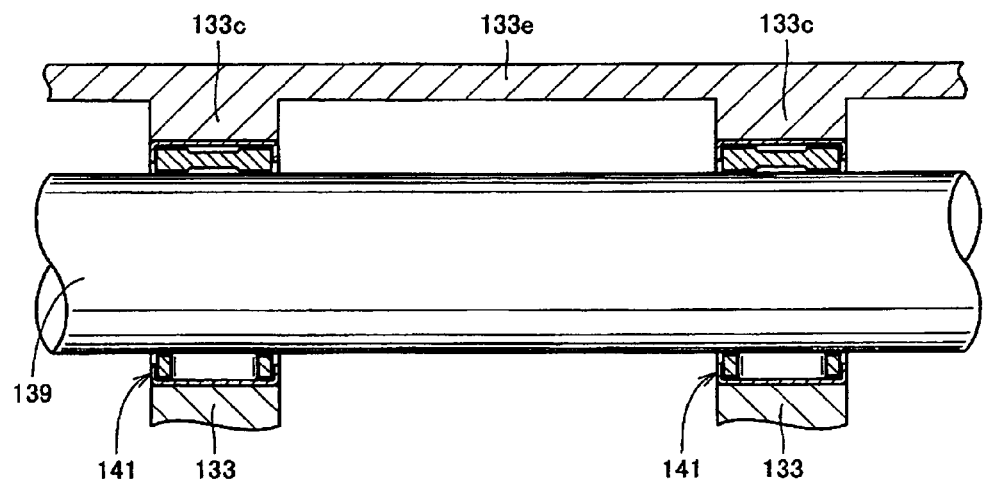
FIG. 46 is a sectional view taken along XLVI-XLVI in FIG. 45.

A cam shaft support structure according to sill another embodiment of the present invention will be described with reference to FIGS. 45 and 46. In addition, FIG. 45 is a sectional view showing a cam shaft support structure taken along a plane perpendicular to its rotation axis, and FIG. 46 is a sectional view taken along XLVI-XLVI in FIG. 45. In addition, since the basic constitution of the cam shaft support structure is the same as that of the cam shaft support structure shown in FIGS. 39 and 40, the description of the same part will not be reiterated and a difference point will be described mainly.

Referring to FIG. 45, the cam shaft support structure according to still another embodiment of the present invention comprises a housing 133 and 133c, a cam shaft 139, and a needle roller bearing 141 supporting the cam shaft 139 rotatably with respect to the housing 133. In addition, since the needle roller bearing 141 has the same constitution as that of the needle roller bearing 101, its description will not be reiterated.

The housing comprises a cylinder head 133 and a bearing cap 133c. A recession part 133d for receiving an engagement click 142c of the needle roller bearing 141 is provided in the inner diameter surface of the bearing cap 133c, and a relatively thick part 133e is provided at the position of an outer diameter surface so as to correspond to the recession part 133d.

As descried above, the recession part 133d of the bearing cap 133c is positioned on a phantom line $l_2$ extending in the direction of a maximum load applied from the cam shaft 139 to the needle roller bearing 141. Thus, when the thick part 133e is positioned at this position, the rigidity of the bearing cap 133c lowered because the recession part 133d is provided can be compensated.

Furthermore, referring to FIG. 46, the thickness part 133e extends in the axis direction of the cam shaft 139 and connects the adjacent bearing caps 133c. Thus, when the thick part 133e serves as the connecting member for connecting the adjacent bearing caps 133c, the assembling property of the cam shaft support structure can be improved. In addition, the rigidity against the inclination of the cam shaft 139 (vertical direction in FIG. 46) can be improved.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

INDUSTRIAL APPLICABILITY

The present invention can be advantageously applied to the roller bearing for supporting the cam shaft of the car engine, the cam shaft support structure and the internal combustion engine.

The invention claimed is:
1. A roller bearing comprising:
an outer ring formed by connecting a plurality of arc-shaped outer ring members in a circumferential direction; and
a plurality of rollers arranged along a track surface formed in an inner diameter surface of said outer ring, wherein
said outer ring has an engagement click bent formed from said outer ring's circumferential end to the radial outer side so as to engage with a housing, and further wherein said outer ring member includes:
a projection part projecting from one circumferential side end in the circumferential direction;
flat parts provided at axial both sides of said projection part so as to be parallel to the axial direction of the bearing;
a recession part recessed from the other circumferential side end in the circumferential direction so as to receive said projection part of said adjacent outer ring member; and
engagement clicks are provided on axial both sides of said recession part.
2. The roller bearing according to claim 1, wherein said engagement clicks are provided only at one side end of circumferential both side ends of said outer ring member.
3. The roller bearing according to claim 1, wherein said engagement clicks are provided apart from said track surface.

4. The roller bearing according to claim 1, wherein
said plurality of engagement clicks are arranged on a straight line parallel to a rotation axis of the bearing.
5. The roller bearing according to claim 1, wherein
said outer ring member is produced by a first step of quenching the whole outer ring member, and
a second step of tempering only said engagement clicks after said first step.
6. The roller bearing according to claim 1, wherein
said engagement clicks project from a plurality of parts of the circumferential end of said outer ring member and connected to each other at a position apart from said circumferential end.
7. The roller bearing according to claim 6, wherein
a region surrounded by the circumferential end of said outer ring member and said engagement clicks functions as a bolt hole for a bolt to fix a housing.
8. The roller bearing according to claim 1, wherein
said outer ring member further includes an oil hole having an opening penetrating from the outer diameter surface to the inner diameter surface, and
when it is assumed that an effective length of said roller is l, and a diameter of said oil hole on the inner diameter surface side is $d_1$, they satisfy that
$d_1/l<0.5$.
9. The roller bearing according to claim 8, wherein
said roller includes a rolling surface provided in the axial center and abutting on the inner diameter surface of said outer ring member, and chamfered parts at both ends of said rolling surface, and
said oil hole is provided at a position opposed to said rolling surface of said roller.
10. The roller bearing according to claim 1, wherein
said roller bearing further comprises a retainer for retaining an interval between said rollers, and
said retainer has a split line provided at one part on the circumference and extending in the axial direction of the bearing.
11. The roller bearing according to claim 10, wherein
said outer ring member includes a flange part projecting from its axial end to the radial inner side to regulate the axial movement of said retainer.
12. The roller bearing according to claim 11, wherein
said retainer includes an axial end face opposed to the axial inner-side wall surface of said flange part, and an expansion part extending from said axial end face to a position opposed to a most inner diameter part of the flange part of the outer ring member.
13. The roller bearing according to claim 12, wherein
said expansion part includes a projection part projecting to the radial outer side so as to be opposed to the axial outer-side wall surface of the flange part of said outer ring member.
14. The roller bearing according to claim 12, wherein
said outer ring member further includes a bend part bent from the most inner diameter part of said flange part to the axial inner side, and
said retainer further includes a recession part in the axial end face to receive said bend part.
15. The roller bearing according to claim 1, wherein
said engagement click is low in hardness as compared with other part of said outer ring member.
16. The roller bearing according to claim 1, wherein
a wall surface of said engagement click continued to the outer diameter surface of said outer ring member and/or a wall surface of said engagement click continued to the inner diameter surface of said outer ring member comprise a plurality of parts having relatively different heights.
17. A roller bearing comprising:
an outer ring formed by connecting a plurality of arc-shaped outer ring members in a circumferential direction; and
a plurality of rollers arranged along a track surface formed in an inner diameter surface of said outer ring, wherein
said outer ring has an engagement click bent formed from said outer ring's circumferential end to the radial outer side so as to engage with a housing, wherein
said engagement click is low in hardness as compared with other part of said outer ring member.
18. A roller bearing comprising:
an outer ring formed by connecting a plurality of arc-shaped outer ring members in a circumferential direction; and
a plurality of rollers arranged along a track surface formed in an inner diameter surface of said outer ring, wherein
said outer ring has an engagement click bent formed from said outer ring's circumferential end to the radial outer side so as to engage with a housing, wherein
a wall surface of said engagement click continued to the outer diameter surface of said outer ring member and/or a wall surface of said engagement click continued to the inner diameter surface of said outer ring member comprise a plurality of parts having relatively different heights.
19. The roller bearing according to claim 18, wherein
a wall surface of said engagement click continued to the outer diameter surface of said outer ring member and/or a wall surface of said engagement click continued to the inner diameter surface of said outer ring member comprise a projection part projecting from said wall surface.
20. The roller bearing according to claim 18, wherein
a wall surface of said engagement click continued to the outer diameter surface of said outer ring member and/or a wall surface of said engagement click continued to the inner diameter surface of said outer ring member comprise a knurling groove.
21. The roller bearing according to claim 18, wherein
said engagement click further includes a bend part having a tip end bent in a direction intersecting said wall surface.
22. A roller bearing comprising:
an outer ring formed by connecting a plurality of arc-shaped outer ring members in a circumferential direction; and
a plurality of rollers arranged along an inner diameter surface of said outer ring, wherein
said outer ring member includes an engagement click provided only at one circumferential side end of both side ends to engage with a housing, and further wherein
said outer ring member includes:
a projection part projecting from one circumferential side end in the circumferential direction;
flat parts provided at axial both sides of said projection part so as to be parallel to the axial direction of the bearing;
a recession part recessed from the other circumferential side end in the circumferential direction so as to receive said projection part of said adjacent outer ring member; and
engagement clicks are provided on axial both sides of said recession part.
23. A roller bearing comprising:

an outer ring formed by connecting a plurality of arc-shaped outer ring members in a circumferential direction; and a plurality of rollers arranged along a track surface formed on an inner diameter surface of said outer ring, wherein said outer ring member includes an engagement click provided at a position apart from said track surface of its circumferential end to engage with a housing, and further wherein said outer ring member includes:

a projection part projecting from one circumferential side end in the circumferential direction;

flat parts provided at axial both sides of said projection part so as to be parallel to the axial direction of the bearing;

a recession part recessed from the other circumferential side end in the circumferential direction so as to receive said projection part of said adjacent outer ring member; and engagement clicks are provided on axial both sides of said recession part.

24. A cam shaft support structure comprising:
a cam shaft;
a housing holding said cam shaft; and
the roller bearing supporting said cam shaft rotatably with respect to said housing according to claim 1.

25. The cam shaft support structure according to claim 24, wherein
said cam shaft is divided into a load region in which a relatively high load is applied, and a non-load region in which a relatively low load is applied during the rotation, in its circumferential direction and
said engagement clicks are arranged at a position corresponding to said non-load region.

26. The cam shaft support structure according to claim 24, wherein
said engagement clicks are at the other side end, and
said roller bearing is arranged such that the rotation direction of said cam shaft and the projection direction of the projection formed in said outer ring member coincide with each other.

27. A cam shaft support structure comprising:
a cam shaft;
a housing holding said cam shaft; and
a roller bearing supporting said cam shaft rotatably with respect to said housing, wherein
said roller bearing includes an outer ring formed by connecting a plurality of arc-shaped outer ring members in a circumferential direction, and a plurality of rollers arranged along an inner diameter surface of said outer ring, and said outer ring member includes an engagement click projecting from the axial end to the radial outer side to engage with the housing, and a projection part and a recession part receiving said projection part to prevent said outer ring member from escaping from said housing are formed in opposed wall surfaces of said engagement click and said housing, respectively, and further wherein said outer ring member includes:

an outer ring member projection part projecting from one circumferential side end in the circumferential direction;

flat parts provided at axial both sides of said outer ring member projection part so as to be parallel to the axial direction of the bearing;

an outer ring member recession part recessed from the other circumferential side end in the circumferential direction so as to receive said outer ring member projection part of said adjacent outer ring member; and engagement clicks are provided on axial both sides of said outer ring member recession part.

28. The cam shaft support structure according to claim 27, wherein
said projection part and said recession part are positioned on a line extending in a direction of a maximum load applied from said cam shaft to said roller bearing.

29. The cam shaft support structure according to claim 27, wherein
said outer ring member further includes a flange part projecting from the axial end to the radial inner side, and
said engagement click and said flange part are positioned on the same plane intersecting the rotation axis of said roller bearing.

30. An internal combustion engine comprising:
a housing;
a cylinder provided in said housing;
a valve opening and closing an inlet path and an exhaust path continued to said cylinder;
a cam shaft controlling the opening and closing timings of said valve; and wherein,
the roller bearing according to claim 1 supports said cam shaft rotatably.

31. The internal combustion engine according to claim 30, wherein
said engagement click is at the other side end, and
said roller bearing is arranged such that the rotation direction of said cam shaft and the projection direction of the projection part formed in said outer ring member coincide with each other.

32. An incorporating method of the roller bearing according to claim 1, wherein
said method comprises a step of arranging said roller bearing such that the rotation direction of said cam shaft and the projection direction of the projection part formed in said outer ring member coincide with each other.

* * * * *